United States Patent [19]

Holschlag, deceased et al.

[11] 3,935,436

[45] Jan. 27, 1976

[54] COLOR MEASURING SPECTROPHOTOMETER

[75] Inventors: Jerry B. Holschlag, deceased, late of Greenwood, S.C., by Joan D. Holschlag, executrix; Lyle Wilcox, Clemson, S.C.

[73] Assignee: Greenwood Mills, Greenwood, S.C.

[22] Filed: Apr. 24, 1973

[21] Appl. No.: 354,090

[52] U.S. Cl. .............. 235/151.35; 444/1; 356/244; 356/96; 356/177
[51] Int. Cl.² ..................... G06F 15/20; G01J 3/00
[58] Field of Search .......... 444/1; 356/177, 173, 96, 356/176, 244; 235/151.3, 151.35

[56] References Cited
UNITED STATES PATENTS

| | | | |
|---|---|---|---|
| 3,531,208 | 9/1970 | Ward | 356/176 |
| 3,601,589 | 8/1971 | McCarty | 235/150 |
| 3,672,780 | 6/1972 | Piringer | 356/177 X |
| 3,791,745 | 2/1974 | MacHenry | 356/244 |

OTHER PUBLICATIONS

Preparation and Mounting Textile Samples for Color Measurement, W. L. Matthews, Jr., American Dyestuff Reporter, July 29, 1968, pp. 30–36.

*Primary Examiner*—Edward J. Wise
*Attorney, Agent, or Firm*—Cushman, Darby & Cushman

[57] ABSTRACT

A digital, abridged spectrophotometer with a detecting head defining a roughly spherical, reflective inner surface broken by a viewing port and a light source port with a number of filtered photodiodes mounted in the head for each receiving light from a sample or standard in the viewing port. A standard sheet of vitrolite is mounted on the housing for movement with a plunger, which trips a switch, to cover the viewing port, while a standard black sheet can be pivoted to cover the viewing port for the calibration which precedes each reading. A digital computer calculates the tristimulus values from the signals produced by the photodiodes and provides signals for a display of the color values.

64 Claims, 8 Drawing Figures

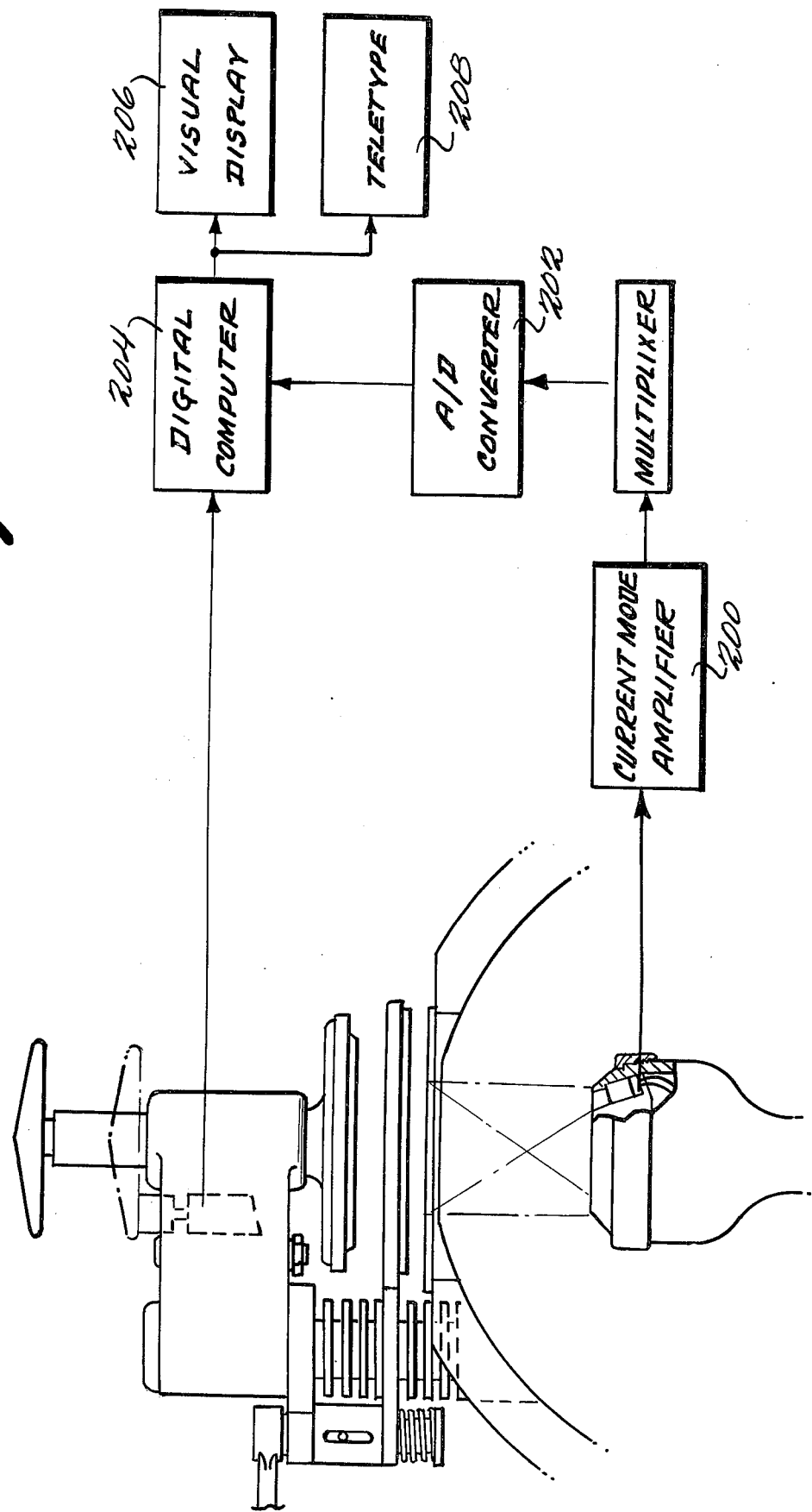

COLOR MEASURING SPECTROPHOTOMETER

BRIEF DESCRIPTION OF THE PRIOR ART AND SUMMARY OF THE INVENTION

The invention relates to a high speed digital, abridged specrophotometer.

Many industries producing colored items, such as textiles and plastics, are finding themselves burdened with ever-increasing numbers of articles which must be classified or sorted according to their color. Within the textile industry the emphasis on quality control and automation have intensified the need for fast response color monitoring devices capable of controlling a continuous process.

At present much of the shade sorting is done visually. Visual shade sorting has some physical limitations. Metamerism cannot be detected unless the material being sorted is examined several times under different types of light. The color descriptors are nonnumerical, and are made with reference to one of the samples being sorted, complicating the task of keeping permanent records for future comparison. In addition, there is a shortage of qualified colorists. Regardless of its shortcomings, visual shade sorting is widely used in industry, as there are now no commercially available color measurement systems fast and accurate enough to compete successfully with their human counterparts.

Many of the basic color measurement instruments being marketed today were developed over two decades ago. These instruments, which are mechanically actuated, are inherently slow. When they were designed, digital computers were not available, and the reflectance data was reduced manually. Since the manual data reduction was time consuming, the data acquisition time of the instrument was not important. By linking a conventional spectrophotometer to a digital computer, reflectance data which takes the instrument several minutes to acquire can be reduced in a fraction of a second. The faster commercially available instruments require from 18 seconds to two minutes to acquire the reflectance data. This speed is limited by the mechanical nature of the instrument.

Many different color notation and specification systems have been suggested in the part. Of these systems, the most generally used and therefore the most completely documented is the Commission Internationale de l'Eclairage (CIE) System. The well-known CIE color notation system uses three unique color stimulus specifications which are generally referred to as tristimulus values. These tristimulus values represent a mathematical transformation from the inconvenient mixed relationships of a set of three primaries, and the tristimulus values, usually denoted as X, Y and Z, can be used to accurately specify any desired color.

The U.S. Pat. to Ward No. 3,531,208 describes a colorimeter system in which a logic network is used to analyze electrical signals derived from a number of photocells, each receiving light reflected from a sample over a band of frequencies generally defined as the equal energy spectrum to quickly produce the tristimulus values. Reed relays and solid state switches are employed to configure analog signals into summations and ratios as needed for the tristimulus equations. Further, switches are used to clock and count integration time and thereby provide means for digitally indicating tristimulus voltage levels.

The present invention relates to a color measuring system somewhat similar to that described in Ward and having a number of unique aspects. The system includes a unique detector assembly including a housing defining a roughly spherical, reflective internal surface with a viewing port over which a sample or standard is placed, and a light source for illuminating the interior of the housing.

Inside the housing is a detector head containing sixteen solid state photodiodes which each detect light reflected from a sample or standard in the viewing port, and convert this light energy into an appropriate electrical signal. In front of each photodiode is an interference filter which removes all but a given, for example twenty nanometer, band of wavelengths in the vicinity of its center wavelength. The center wavelengths of the 16 interference filters are evenly spaced over the visible spectrum, for example one every 20 nanometers from 400 to 700 nanometers, allowing each photodiode to detect a small segment of the visible spectrum. The detector head is centered normal to the viewing port enabling each photodiode to detect reflected light from approximately the same area of the specimen.

The sample to be measured is placed over the viewing port, and a plunger mounted over the port is depressed. As the plunger reaches the end of its travel, pressing the sample against a cover over the viewing port, it trips a switch, which initiates the reading. Light reflected from the sample at the bottom of the plunger passes through the interference filters to the photodiodes. Sixteen electrical signals are generated containing the spectral information of the light reflected from the material on the cover over the viewing port. The signals result from connecting the photodiodes to an operational amplifier designed to operate the diodes in a current mode. Up to this point, the signals have been generated simultaneously rather than sequentially. It is this parallel operation that is largely responsible for the extremely short measurement time attained by the system. The signals are multiplexed and converted to a form acceptable to a digital control unit by a conventional analog to digital convertor. To improve the signal to noise ratio approximately 120 readings are taken and averaged by the digital unit. This average is then processed by the digital control unit which is preferably a small computer to calculate the desired color quantifiers, and display them via a visual display panel and/or a teletype or the like.

To reduce the amount of maintenance required to keep the system operational, the minimum amount of analog and mechanical auxiliary equipment is used. A small computer is used to compensate and update parameters, thus eliminating the complicated mechanical and optical apparatuses and moving parts associated with conventional spectrophotometers. Because a preprogrammed digital control unit is an integral part of the system, all of the balancing, nulling, and other operator routines commonly associated with spectrophotometers have been eliminated. The system is automatic and no special long-term training is required to operate it.

The plunger mounted atop the spherical housing also functions to move a standard sheet of vitrolite or the like from a rest position above the viewing port to a position in intimate contact with the clear glass pane covering that port. A further glass sheet of, for example, a black standard can also be pivoted from a position mounted on the housing to a position over the viewing port and thereafter shifted vertically into a position also in intimate contact with the cover over the viewing port.

One difficulty which has been encountered with this type of color measuring system in the past is that the system tends to drift rapidly from a calibrated condition, thus causing inaccurate results. This problem is obviated according to one aspect of this invention by requiring the calibration of the unit prior to each and every measurement and providing apparatus for quickly carrying out that calibration.

In the embodiment of the invention described below, manually depressing the plunger to push the vitrolite glass sheet into contact with the clear glass cover over the viewing port without the interposition of any sample trips a switch which begins a measuring cycle. The voltage signals derived from the photodiodes with the vitrolite sheet in contact with the cover over the viewing port are then read by the computer. After the plunger is released to return to its rest position, the sheet of standard black is then manually pivoted by a second handle into a position over the viewing port. The signals derived from these two measurements are then used by the computer to calibrate the system for the subsequent measurement of a sample which is accomplished by manually pushing the plunger down so that the vitrolite sheet forces the sample onto the cover over the viewing port and excludes as many stray light as possible. The computer allows a brief time, for example 10 seconds to complete calibration and measurement after the initial tripping of the switch.

One of the most significant attributes of this invention is its speed. Excluding operator time for inserting the sample, it requires 0.64 seconds system time per measurement. Using a high speed output device such as a line printer or magnetic tape unit, the system can measure samples at the rate of 12 per minute, assuming about 4 seconds of operator time per sample. By employing an automatic sample feeding mechanism, the full potential of the machine, as high as 100 samples a minute, can be realized.

Many other objects and purposes of the invention will become clear from the following detailed description of the drawings.

BRIEF DESCRIPTION OF THE DRAWINGS

FIG. 7 shows a schematic of circuitry for analyzing the electrical signals provided by the photoresponsive devices in the detector assembly.

DETAILED DESCRIPTION OF THE DRAWINGS

Figure 1:
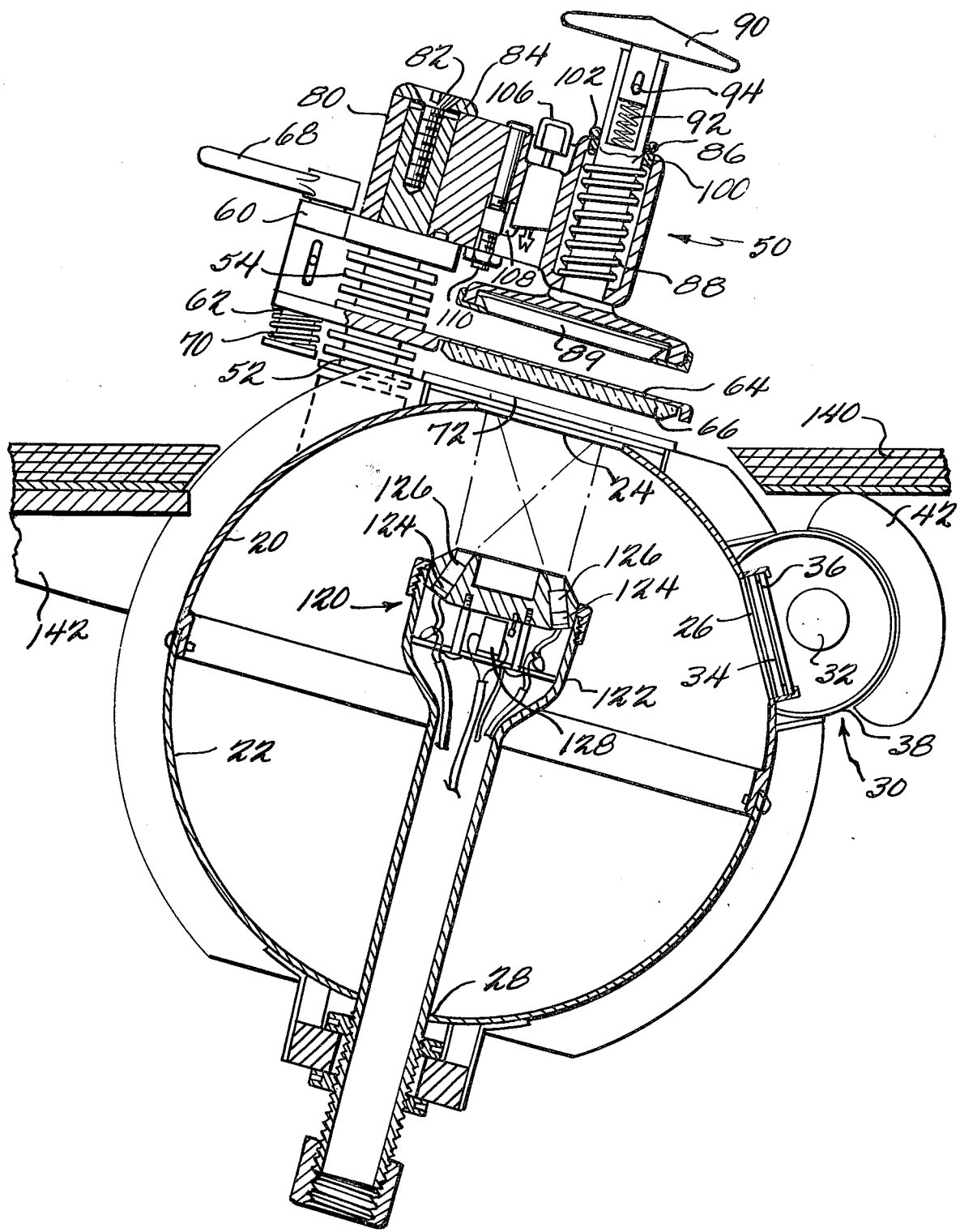
FIG. 1 shows a cut-away view of the novel detector assembly of this invention.
Figure 2:
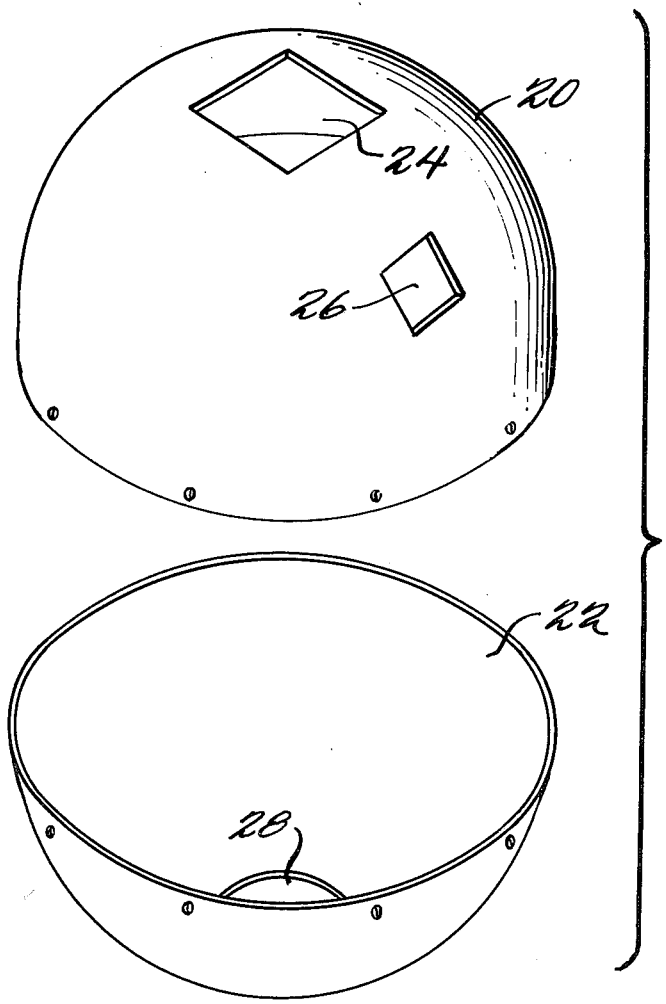
FIG. 2 shows an exploded view of the two members which form the roughly spherical housing.

Reference is now made to FIG. 1 which shows a cut-away view of the unique detector assembly which forms a part of the unique system of this invention. As discussed briefly above, the detector assembly includes a pair of hemispherical members 20 and 22 which are shown exploded in FIG. 2, and which fit together and are connected together by rivets or any other suitable means to define a roughly spherical, internal surface which is reflective and which is broken by three ports 24, 26 and 28. A light assembly 30 is mounted adjacent port 26 for illuminating the roughly spherical internal surface defined by member 20 and 22. Assembly 30 includes a lamp 32, which, for example, can be a 120 volt, 500 watt, Quartz-line projector lamp. A pair of filters 34 and 36 are provided to remove infrared radiation. Lamp 32 is mounted by any suitable means within a reflector 38 which is surrounded by a heat dissipating fin 42 which aids in cooling lamp assembly 30.

The detector assembly also includes a further assembly 50 which is used for presenting both samples and standards for measurement and calibration. Assembly 50 includes a bracket 52 which is mounted on member 22 in any suitable fashion. Cooling fins 54 are provided on bracket 52 for aiding in heat dissipation. A further bracket 60 is mounted rigidly on bracket 52 and has mounted pivotably therein a shaft 62 having an arm 64 which holds a glass sheet of standard black material 66. Arm 64 and black sheet 66 can be pivoted by means of handle 68 from a rest position to the position illustrated with the black sheet 66 over port 24 in hemispheric member 22. When the black sheet 66 is over port 24, handle 90 can then be depressed so that vitrolite 89 comes in contact with arm 64. Further movement of handle 90 will bring black tile 66 into intimate contact with glass cover 72, whic ocvers opening 24 and defines a roughly circular opening two inches in diameter. Black sheet 66 is used in the calibration operation, as discussed in detail below.

A further member 80 if mounted on bracket 52 by means of set screw 82 and cap 84. Member 80 has a bore in which shaft 86 can be moved downward against the urging of spring 88 to similarly force a sheet of glass material 89, such as vitrolite, into contact with clear glass cover 72 over port 24. Manually pushing down on handle 90 causes that handle to move downward against the urging of spring 88 until vitrolite 89 has come into intimate contact with clear glass cover 72. Then handle 90 continues to travel against urging of spring 92 until pin 94 has reached its uppermost limit of travel. A retaining ring 100 moves downward with shaft 86 and in its uppermost position contacts C ring 102 which stops the upward travel of retaining ring 100, and accordingly shaft 86.

A conventional switch assembly 106 is also mounted within a bore in member 80. Switch 106 is held at an appropriate position in that bore by means of a stop 108 which is mounted on a threaded bolt 110 to be vertically adjustable, so that, when vitrolite sheet 89 is intimately in contact with clear glass cover 72, switch 106 is tripped to begin the measurement cycle as discussed in detail below.

The detector assembly shown in detail in FIG. 1 also includes a detector head 120. Head 120 is comprised of a hollow bracket 122 in which are mounted symmetrically about axis B–B' a number of semi-conductor devices of the type having a characteristic which changes with the intensity of incident light. In the particular embodiment illustrated in FIG. 1, sixteen Schottky Barrier, solid state diodes 124 were employed. Each of these diodes is mounted as shown to receive incident light over an area A of the opening 24 such that all diodes receive light reflected from essentially the same area of any specimen or standard in viewing port 24. Sixteen narrow band interference filters 126 are disposed respectively over the photodiodes and each of these conventional filters functions to remove light except in a narrow band about predetermined frequencies. A range of 4000°A to 7000°A by 200°A separations has been found quite satisfactory. If desired, fiber optics tubes can be used to transmit received or source light.

A conventional heater 128 is mounted within bracket 122 to maintain the temperature of the photodiodes at a constant level. A Dale type 10–100 RH watt, 10 ohm 11 percent resistive heater has been found satisfactory for this purpose. The power to this heater is preferably controlled by a thermister temperature controller such as Yellow Springs Instrument Model 63 RC Thermistemp which senses the detector head temperature with a 15 K ohm thermister 130 located inside detector head 120.

Figure 4:
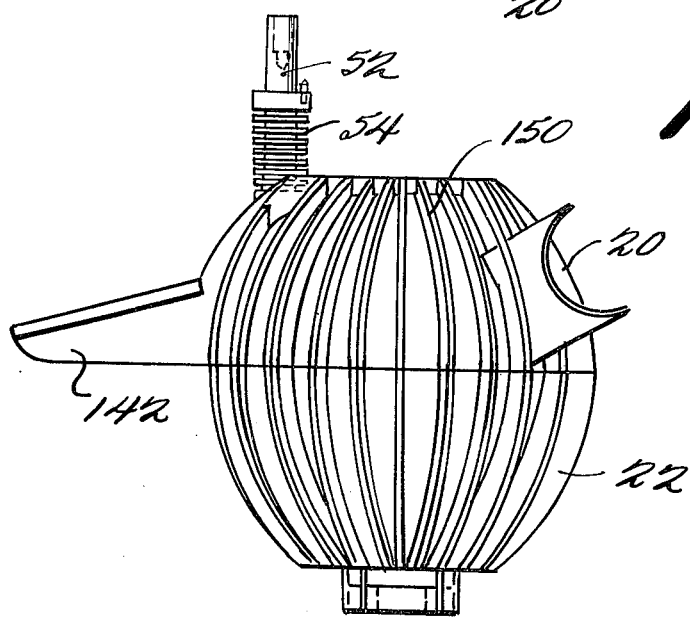
FIG. 4 shows a side view of the assembly of FIG. 3.

The detector assembly depicted in FIG. 1 is preferably mounted as shown on a table top 140 by means of a bracket 142 which can be seen best in FIG. 4.

Figure 3:
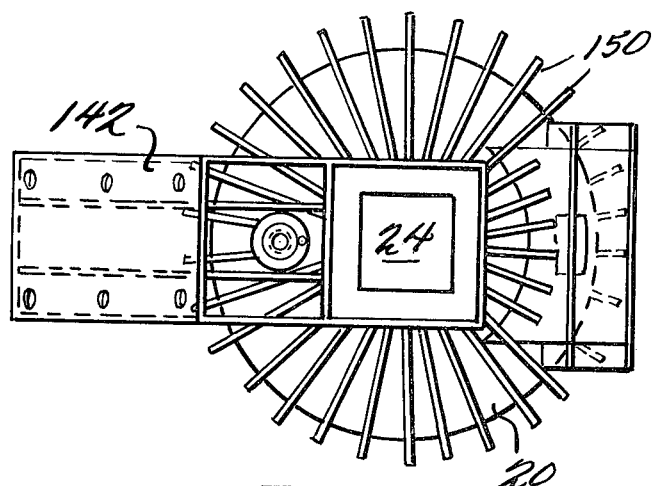
FIG. 3 shows a top view of the detector assembly without the top bracket and illustrating the cooling fins.
Figure 5:
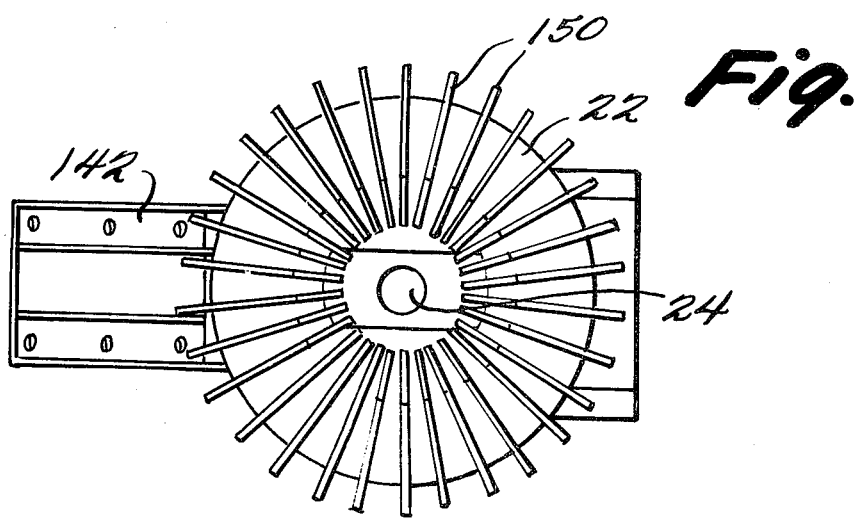
FIG. 5 shows a bottom view of the assembly of FIG. 3.

FIGS. 3–5 illustrate detector assembly showing the cooling fins 150 which are preferably provided on the exterior of members 20 and 22 to assist in maintaining the interior of the detector assembly and accordingly photodiodes 124 at a constant temperature.

Figure 6:
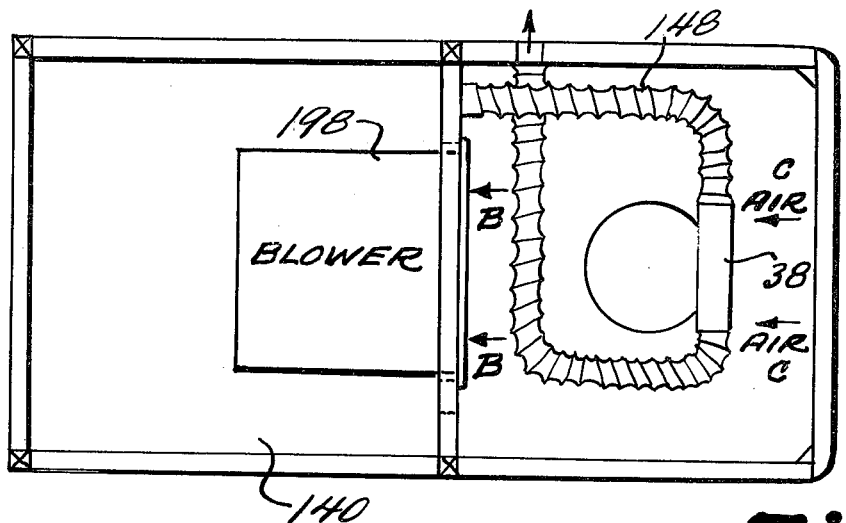
FIG. 6 shows a plan view of a blower arrangement for cooling the detector assembly while in use.

FIG. 6 illustrates one simple arrangement for assisting in removing hot ambient air from a region about the detector assembly and from light assembly 38. In this arrangement, a blower 198 is mounted beneath table 140 adjacent to the detector assembly. Blower 198 draws air from the region of the detector assembly as indicated by the arrows B and forces that air away from the assembly via conduit 148, passing over lamp 32 which is in light assembly 38. Thus, the warm air surrounding the detector assembly is drawn away from it and fresh air, as indicated by arrows C, rushes in to draft the detector assembly.

Reference is now made to FIG. 7 which illustrates in block diagram circuitry for analyzing color information derived from a sample or a standard material presented to the detector assembly shown in FIG. 1. The signals derived from each of the sixteen photodiodes are transmitted to amplifier unit 200, which includes sixteen separate sensor current input amplifiers, each connected to one of the photodiodes. In the embodiment shown in FIG. 7, each of the sensor amplifier circuits employs a standard field effect transistor input operational modular amplifier.

The sensor amplifiers (Philbrick-Nexus 1009 ) included in amplifier unit 200 are current controlled and present a low impedance to the photodiodes. These amplifiers provide an output voltage proportional to the photodiode current which is in turn proportional to the radiant power absorbed by the active area of the diode. The sensor signals provided to the amplifier unit 200 are amplified, for example, to a level from −10 to +10 volts, to provide an acceptable signal to the conventional analog to digital converter 202. A DEC ADO1-AN analog to digital converter was used in the specific embodiment constructed.

The digital output of conventional converter 202 is applied to a general purpose, small digital computer 204 which operates to control the automatic measurement and to provide the necessary computations. Digital computer 204 provides signals both to a conventional visual display unit 206 and to a teletype unit 208.

In the specific embodiment which was constructed, the digital control unit 204 consisted of a PDP8-E computer with 4K of core memory, a DEC KM8-E memory extension control for an additional 4K of memory, a DEC DK8E real time clock for referencing the system functions to real time, and a DEC KL8-E serial line interface for the teletype unit 208. In conjunction with this particular computer, a DEC KA8-EA positive I/O interface, which allows data transfer between the central processor and the peripherals including digital converter 202 and display 206, was also employed.

While this particular computer unit functions quite satisfactorily any of a number of different types and models of computers now available on the marketplace can, of course, be alternatively employed. The operation of this particular computer unit is discussed in much greater detail in a volume available from the Digital Equipment Corporation and entitled PDP 8/E SMALL COMPUTER HANDBOOK. The contents of this book are explicitly incorporated herein by reference.

The particular display device which was used in the model constructed utilized three sets of Sperry-Rand Model SP-733, 3 numeral, 7-segment, neon gas discharge tubes, nine Motorola MC747P5 Quad bistable latches, nine Sperry Rand Model DL-730 decoder drivers, and a DEC Model M103device selector card for displaying three color descriptors calculated from the reflectance data of the sample being measured as discussed below. Any other displays providing an appropriate communication of the information produced by computer 204 can be employed.

As discussed briefly above, one of the problems which has been found to exist with units of this type in the past has been the tendency of the units to very quickly drift away from a calibrated condition. To overcome this problem according to one aspect of this invention, the system is constructed to carry out a two point calibration or standardization prior to each and every measurement. According to this system, measurement is initiated by first bringing, either manually or automatically, vitrolite glass sheet 89 into intimate contact with the glass cover 72. Just before contact is made, switch 106 provides an initial signal to computer 204 as shown schematically in FIG. 7. Computer 204 then reads the amplified voltages on each of the sixteen diodes provided by converter 202 and relates the sampled vitrolite voltage values to the expected or known computer stored reflectance values for vitrolite sheet 89 which serves as a standard color or tile for one of the calibration points. The relation therebetween is an equation modifier which is stored in the computer for each channel and modified if necessary at such subsequent reading of the vitrolite. The same is done for the black standard, i.e., the standard black sheet 66 is then brought into position over viewing port 24 onto cover 72 to provide a second set of calibrating signals for computer 204, and between the two modifiers the computer automatically operates on a new two point line from which the determination of the color of cloth or the like can be effected.

Immediately following tripping of switch 106, digital computer 204 sets an internal timer which provides a short time interval for the operator to pivot black sheet 66 into place and thereafter to place a sample of material on cover 72 and again depress handle 90 until sheet 89 presses the sample firmly against cover 72 to prevent any stray light from entering the detector assembly through viewing port 24.

As an alternative and according to another embodiment developed, the calibration or standardization procedure before each measurement can be limited to a reading of vitrolite sheet 89 and correction in accordance with that reading. At the time of warm-up and periodically thereafter, for example, each 30 minutes, sample measurements are interrupted to perform a full calibration using at least two different standards, for example, both vitrolite sheet 89 and black sheet 66.

Figure 8:
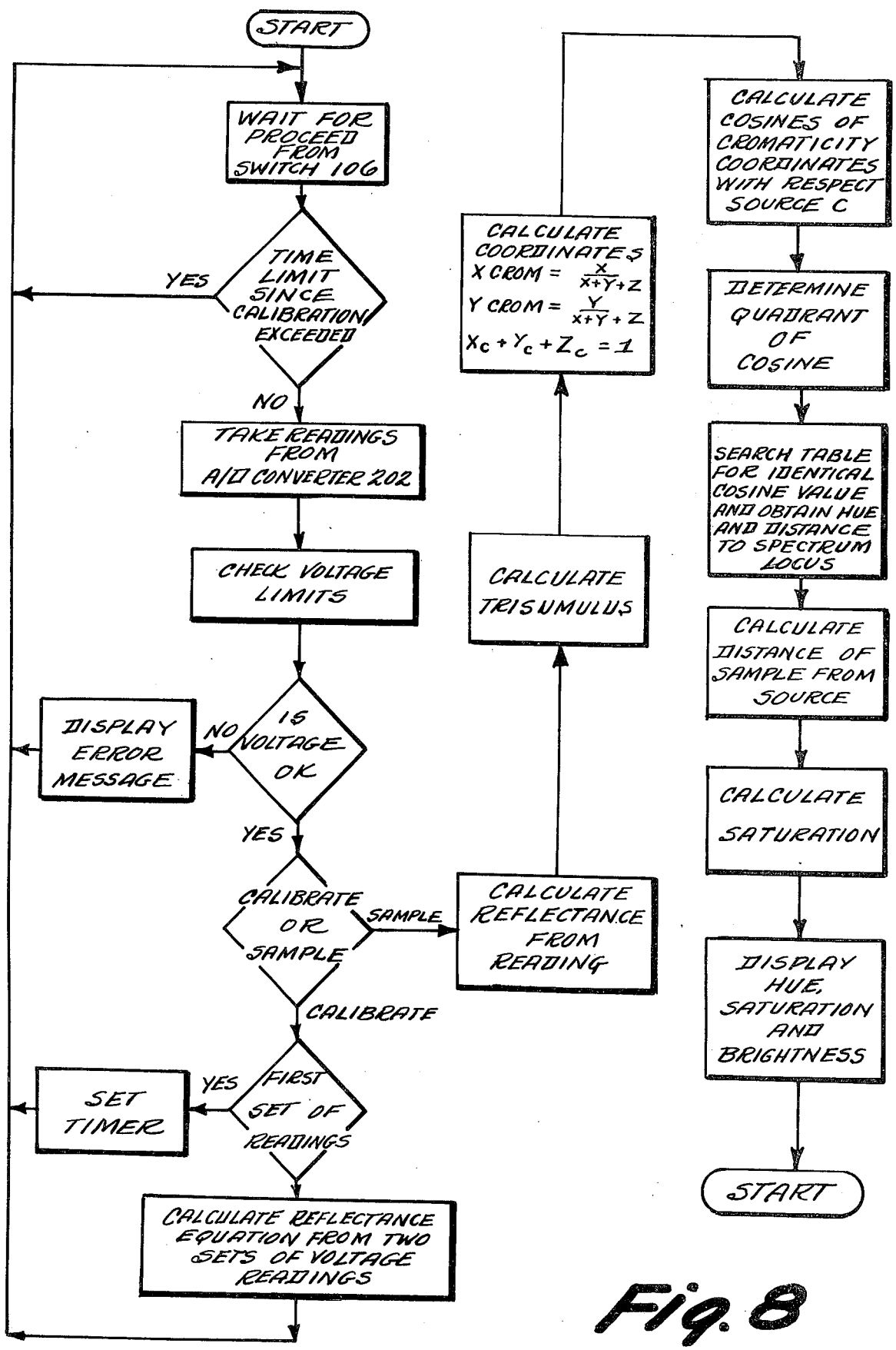
FIG. 8 shows a flow diagram of the method carried out by the computer to calculate and display the hue, saturation and brightness for a sample using the reflectance values.

Reference is now made to FIG. 8 which shows a flow diagram of the program carried out by digital computer 204, such program being reproduced in its entirety below. As shown, the computer first checks to determine whether the short time interval which is provided to carry out the measurement after tripping of the initiation button or switch 106 has been exceeded. If it has not, the readings are accepted from the analog to digital converter, and at least 120 interleaved readings are taken from each of the 16 sensor outputs. Taking a large number of readings, which can be done in a very short time, reduces the 60-cycle and high frequency noise which are averaged out over the group of samples. Next a check is made to ascertain if the voltages produced by A/D converter 202 are excessive. For this purpose, each channel output from each of the photodiodes is usually added in an accumulator to provide a net sum which is compared with a stored value. If the total voltage is acceptable, the computer then checks to ascertain whether the system has yet been calibrated for this particular measurement. If it has not, the calibration is carried out and the above steps repeated according to the flow diagram. After calibration is completed, the computer proceeds to calculate the various color quantifier values desired and to produce the signals which are coupled to the display or teletypewriter for providing the desired color information.

The following is the complete computer program for carrying out the functions described above. It is written in the conventional and well known PAL III language.

```
/IPALL-GW
/
*4
MODE,0000    /
*7
    5600
AUTO1,0
AUTO2,0
AUTO3,0
AUTO4,0
AUTO5,0
AUTO6,0
AUTO7,0
AUTO8,0
TALLY1,0
TALLY2,0
TALLY3,0
STDSAM,0
D32,40
M4,-4
TIME,0
NMINS,0
LGAINS,GAINS-1
LSAVE1,SAVE1-1
*33
LBIDEC,0
/DO NOT MOVE LBIDEC HSB USES
/
/IN THE THREE WORD FLOATING POINT PACKAGE THERE ARE TWO
/OUTPUT SUBROUTINES. THERE LOCATIONS ARE:
/    "OUT" AT 7351   (PRINT ONE ASCII CHARACTER).
/    "OUTDIG" AT 7357   (PRINT ONE DIGIT).
/IF FLOATING POINT PACKAGE IS NOT USED, THESE SUBROUTINES
/MUST BE SUPPLIED ELSEWHERE.
/IN ADDITION, THE LOCATION OF THE CONSTANT 10 USED IN HSB
/MUST BE 7470 IF NEW PACKAGE IS USED AND 7504 IF OLD IS USED.
/IN ORDER TO USE NEGATE=10, INPUT=11, AND OUTPUT=12, LOCS
/6554, 6555, AND 6556 IN THE FLOATING POINT PACKAGE MUST
/CONTAIN 6000, 7400, AND 7200 RESPECTIVELY. THIS APPLYS FOR
/BOTH PACKAGES.
/*****
/NOTE: ABSOLUTE ADDRESSES.
LOUT,7351         /LOC OF ASCII PRINT ROUTINE.
/CHANGE TO 7344 IF OLD FLOATING POINT PACKAGE IS USED.
                /*****LOUT USED BY HSB. DO NOT MOVE.
LOUTDI,7357       /LOC OF DIGIT PRINT ROUTINE.
/CHANGE TO 7352 IF OLD FLOATING POINT PACKAGE IS USED.
                /*****LOUTDI USED BY HSB. DO NOT MOVE.
LFINTI,5400       /SEE FLAGS1
LFIX,663
*****
/
```

```
/NOTE: LOCS 40-61 ARE USED BY FLOATING POINT PACKAGE.
/
*55
7777
7777
    *70
/***** NOTE: CRLF USED BY HSP. DO NOT MOVE.
/PRINT CR AND LF
/(ENTER WITH AC=0).
CRLF,0000
    TAD CR
    JMS I LOUT
    TAD LF
    JMS I LOUT
    JMP I CRLF
CR,215
LF,212          /*****USED BY HSB. DO NOT MOVE.
/
    *100
TEMP1,0
    0
    0
TEMP2,0
    0
    0
TEMP3,0
    0
    0
TEMP4,0
    0
    0
TX,0
    0
    0
TY,0
    0
    0
TZ,0
    0
    0
B,0
    0
    0
M,0
    0
    0
/
/*****
*155
AVFLG,1
AVTIM,0
    *157
CFLAG,0
/SEE FLAGSE.
/***** DO NOT MOVE.
/
/PRINT A CHARACTER STRING.
/THE STRING IS STORED ON THE PAGE BEGINNING WITH 1200
/AND ENDS WITH "ALT MODE".
    *161
CHRSTR,0
    CLA CLL
    TAD I PTR    /GET A CHARACTER.
    ISZ PTR      /INCREMENT POINTER.
    MQL          /SAVE THE CHAR.
    MQA          /PUT CHAR IN AC.
    TAD MALT
    SNA CLA      /ALT MODE?
    JMP I CHRSTR /YES, END OF STRING. RETURN.
    MQA          /NO, PUT CHAR IN AC.
    JMS I LOUT   /PRINT CHAR.
    JMP CHRSTR+1 /GET ANOTHER CHAR.
```

```
        PTR,0
        STRING,1000
        MALT,-375
            *200
        /INITILIZATION
            CLA CLL
            KIE   /DISABLE KB AND PRINTER INTERRUPTS
            KIE+350
            TFL   /SET PRINTER FLAG
            CLEI  /ENABLE CLOCK INTERRUPT
        START,CLA CLL  /ZERO VOLTAGE READ INAREAS
            TAD DM32
            DCA TALLY1
            TAD LSAVE1
            DCA AUTO1
            DCA I AUTO1
            DCA I AUTO1
            DCA I AUTO1
            ISZ TALLY1
            JMP .-4
            NL7777
            DCA STDSAM  /= -1 FOR 1ST READING
            TAD STRING
            DCA PTR
        /**NOP FOR NONPRINTING
            JMS CHRSTR  /PRINT FIRST STRING
            JMS I LRCAL /GO TO CALID ROUT FOR 2 READINGS
            NL7777
            DCA TALLY1  /SET SAMPLE COUNTER
        LOOP1,JMS I LWAITJ  /WAIT FOR PROCEED SIGNAL
            CLA CLL
            TAD D32
            TAD AUTO1   /SET REG FOR READ IN AREA
            DCA AUTO1
            JMS I LAVREAD
            NOP
            NOP
            NOP
            NOP
            NL0001
            TAD STDSAM
            HUE    /DISPLAY READING NO
            ISZ TALLY1
            JMP LOOP1   /GO FOR NEXT SAMPLE IF NOT DONE
        /NOW CALC REFLECTANCES
         /CLEAR TX TY TZ
            CLA CLL
            TAD LTX
            DCA AUTO1
            TAD DM9
            DCA TALLY1
            DCA I AUTO1
            ISZ TALLY1
            JMP .-2
        /SET POINTERS AND COUNTERS
            TAD LSAVE1
            TAD D32
            DCA AUTO1   /VITROLITE VOLTAGE
            TAD AUTO1
            TAD D32
            DCA AUTO2   /SAMPLE VOLTAGE
            TAD LB1
            DCA AUTO7   /CURVE COEEFS
            TAD LX1
            DCA AUTO4  /TRIS CONSTANTS
            TAD LVIT1
            DCA AUTO6   /VIT REFL
            TAD DM16
            DCA TALLY1  /SET LOOP COUNTER
            TAD LGAINS
            DCA AUTO3 /GAINS LIST
        LOOP2,CLA CLL
            TAD K13
```

```
        DCA TEMP1    /EXP OF STD
        NOP
        NOP
        TAD K13
        DCA TEMP2    /EXP OF SAM
        TAD I AUTO1
        DCA TEMP1+1
        TAD I AUTO1
        DCA TEMP1+2  /TEMP1 = FP EQV OF STD VOLTAGE
        TAD I AUTO2
        DCA TEMP2+1
        TAD I AUTO2
        DCA TEMP2+2  /TEMP2 = FP EQV OF SAM VOLTAGE
        TAD I AUTO6
        DCA TEMP4
        TAD I AUTO6
        DCA TEMP4+1
        TAD I AUTO6
        DCA TEMP4+2  /TEMP4 = FP EQV OF VIT REFL
        JMS I LCV    /GO TO CURVE ROUTINE
        /IN CURVE ROUTINE CALC REFL FROM VOLTAGER
/PRINT SAME RETURN WITH REFL IN TEMP1, STD IN TEMP3,SAM TEMP2
        TAD DM9
        DCA TALLY3
        TAD LTEMP2
        DCA AUTO5
LOO3,   TAD I AUTO4  /STORE THIS LIST IN TEMPS 2,3,4
        DCA I AUTO5
        ISZ TALLY3
        JMP LOO3
        JMS I LTRIS
        ISZ TALLY1
        JMP LOOP2
/NOP FOR NO PRINT
        JMS I LTTOUT
        JMS I LHSB
        JMP START
NOP
NOP
NOP
NOP
/CONST LIST
DM32,-40
DM16,-20
DM9,-11
K13,26
/INDIRECT ADDRESSES
LVITI,1657   /ADDRESS OF VITROLITE REFL -1
LCV,CV
LTX,TX-1
LWAIT0,WAIT0
LWAIT2,WAIT2
LTTOUT,TTOUT
LTRIS,TRIS
LRCAL,RECAL
LB1,B1-1
LX1,5000-1
LHSB,400
LAVREAD,AVREAD
LTEMP2,TEMP2-1
PAUSE
*1200
/RECALIBRATION ROUTINE
RECAL,0
        NL7776
        DCA TALLY2   /SET COUNTER
LUP,    JMS I LWAT0  /WAIT FOR PROCEED SIG
        JMS I PAVRD  /GO READ VOLTAGES
        NL0001
        TAD STDSAM
        HUE          /DISPLAY READING NO
        CLA CLL
        ISZ TALLY2   /DONE BOTH STDS
```

```
        JMP LUP     /NO
        TAD LBB     /YES
        DCA AUT03   /LOC OF SLOPE B
        TAD LMM
        DCA AUT04
        TAD LBLAK
        DCA AUT05
        TAD LVIT
        DCA AUT06
        TAD LSAVE1  /LOC OF BLACK VOLT
        DCA AUT07
        TAD LSAVE2  /LOC OF VIT VOLT
        DCA AUT08
        TAD MD16
        DCA TALLY3  /SET COUNTER
LOOP3,  TAD LXX1
        DCA AUT02
        TAD I LK13
        DCA XX1     /FLOAT VOLT BLACK SAMP
        TAD I AUT07
        DCA I AUT02
        TAD I AUT07
        DCA I AUT02
        TAD I LK13  /FLOAT VIT VOLT
        DCA I AUT02
        TAD I AUT08
        DCA I AUT02
        TAD I AUT08
        DCA I AUT02
    JMS I 7   /GO TO INTERPUTER
        FGET XX2
        FSUB XX1    /VIT - BLACK VOLTAGES
        FPUT TEMP1  /XX2 - XX1
        FGET I AUT05 /GET BLACK REFL
        FNOR
        FPUT YY1
        FGET I AUT06 /VIT REFL
        FNOR
        FPUT TEMP2  /SAVE INTEMP2
        FSUB YY1    /Y2 - YY1
        FDIV TEMP1  /M = (Y2-YY1)/(XX2-XX1)
        FPUT I AUT04
        FMPY XX2
        FPUT XX1    /NOW XX1=M*XX2
        FGET TEMP2  /VIT REFL
        FSUB XX1    /B = YY2-M*XX2
        FPUT I AUT03 /INTECEPT B
        FEXT
        CLA CLL
        TAD AUT04
        TAD D6
        DCA AUT04
        TAD AUT03
        TAD D6
        DCA AUT03
        NL0003
        TAD AUT05
        DCA AUT05
        NL0003
        TAD AUT06
        DCA AUT06
        ISZ TALLY3
        JMP LOOP3   /IF 16 NOT DONE
        JMP I RECAL
XX1,0;0;0
XX2,0;0;0
YY1,0;0;0
D6,6
LXX1,XX1
LBB,4000
LMM,4003
LBLAK,1600
```

```
LVIT,1660
M16,-20
LSAVE2,4657
LK13,350
LWAT0,WAIT0
PAVRD,AVREAD
NOP
NOP
NOP
PAUSE
*2000
/READ ROUTINE FOR DIGITAL FILTER
AVREAD,0
    JMS I LWAT2
    TAD NUM  /SET COUNTER FOR FILTER
    CIA
    DCA CNTRD
 AVLUP,CLA CLL
    NL0001
TAD AUTO1
   DCA SLSTH
    NOP
    NL0001
    TAD SLSTH /SET INDEXES FOR DOUBLE WORD ACCUMULATION
    DCA SLST
    TAD M16
    DCA CNT /SET CHANNEL COUNTER
    TAD LGAINS
    DCA AUTO3
    NOP
    NOP
AVRED,CLA CLL
    TAD I AUTO3
    ADSC   /SELECT CHANNEL AND GAIN
    ADSF
    JMP .-1
    ADRB    /RREAD AD
    RAL   /SCALE INPUT READINGS
    CML
    RAL
    CML
    RTR   /NO SHOULD NOW BE SCALED SO THAT +10 VOLTS =7777
    TAD I SLST
    DCA I SLST
    RAL
    TAD I SLSTH
    DCA I SLSTH
    ISZ SLST
    ISZ SLST /INCREMENT INDEXES
    ISZ SLSTH
    ISZ SLSTH
    ISZ CNT  /DECREMENT CHANNEL COUNTER
    JMP AVRED  /READ ANOTHER IF 16 NOT DONE
    NOP
    ISZ CNTRD   /DECREMENT FILTER COUNTER
    JMP AVLUP
/ROUTINE FOR SATURATION OR ZERO READING
    TAD M16
    DCA CNT
    TAD AUTO1  /SET INDEXES AND COUNTERS
    DCA AUTO2
SLUP,CLA CLL
    TAD I AUTO2 /GET 1ST READING
    SZA
    JMP TEST1 /GO CHECK FOR > 37 IF NOT 0
    CLA CLL
    TAD I AUTO2 /CHECK SECOND IF 1ST 0
    SNA /CHECK 2ND FOR 0
    JMP LOW /GO TO INVALID IF BOTH 0
    JMP NEXT  /GO CHECK NEXT CHANNEL
 TEST1,TAD M37  /FIRST WORD = 37
    SMA /NO
    JMP TEST2  /YES
```

```
        ISZ AUTO2 /SET INDEX FOR NEXT IF NO
        JMP NEXT
        NOP
    TEST2,CLA CLL /IF 1ST WORD = 37
        TAD I AUTO2 /CHECK SECOND
        SPA /IF 2ND < 3777 DONE
        JMP TLIM /IF NOT CHECK FOR 7600
        JMP NEXT
    TLIM,TAD M7600  /=7600
        SMA    /NO
        JMP HIGH /YES
    NEXT,ISZ CNT
        JMP SLUP
        JMP I AVREAD
    LOW,CLA CLL   /READ 0 VOLTAGE DISPLAY ALL A
        TAD BINA
        HUE SAT BRI
        JMP I RSTRT
    HIGH,CLA CLL  /SATURATION DISPLAY ALLC
        TAD BINC
        HUE SAT BRI
        JMP I RSTRT
        NOP
        NOP
    M37,-37
    M7600,-7600
    BINA,5252
    BINC,6314
    RSTRT,START
        NOP
        NOP
        NOP
        NOP
        NOP
        NOP
    M16,-20
    LWAT2,WAIT2
    CNT,0
    NUM,200 /NO OF READINGS MADE ON EACH CHANNEL
        CNTRD,0
     SLSTH,0
    SLST,0
    PAUSE
    /
        *4200
    /PRINT CHARACTER IN AC THREE TIMES.
    PR3,0000
        MQL
        NL7775       /AC=-3.
        DCA TALLY2
        CLA MQA
        JMS I LOUT
        ISZ TALLY2
        JMP .-3
        JMP I PR3
    /
    /CURVE SUBROUTINES.
    /
    CV,0000
    /
    />>>NOP (7000)<<<
        JMS CHRSTR
    /
        CLA CLL
    /TRANSFER THE DIODE CURVE COEFFICIENTS TO M AND B ON PAGE 0.
        TAD DM6    /-6.
        DCA TALLY3
        TAD LB     /LOC OF B (LESS 1).
        DCA AUTO5
        TAD I AUTO7
        DCA I AUTO5
        ISZ TALLY3 /DONE 6?
        JMP .-3    /NO.
```

```
/               /YES
    NOP
    NOP
    NOP
    TAD I AUTO3   /GET GAIN, ETC.
    AND K300      /STRIP OFF ALL BUT GAIN.
    BSW           /PUT GAIN BITS IN AC 10-11.
    CIA           /NEGATE IT.
    DCA GSTOR     /SAVE IT.
    TAD GSTOR     /GET IT.
    TAD TEMP1     /ADJUST STD READING EXPONENT FOR GAIN.
    DCA TEMP1
    JMS VOLT
    JMS I 7
    FGET TEMP1
    FMPY M
    FADD B
    FPUT TEMP3    /STANDARD.
    FEXT
    NOP
    NOP
    TAD SP
/
    JMS PR3
    NOP
    CLA CLL
    TAD GSTOR     /ADD MINUS GAIN NUMBER.
    TAD TEMP2     /ADD EXPONENT OF SAM READING.
    DCA TEMP2     /PUT IN EXPONENT OF SAM READING.
/NOTE: EXPONENT OF SAM HAS BEEN ADJUSTED FOR GAIN AND
/      FOR FOUR READINGS.
    NOP
    TAD GSTOR     /GET GAIN NUMBER AGAIN.
    TAD LGCHAR    /FIND GAIN (ASCII) IN LIST.
    DCA GSTOR
    TAD I GSTOR
    JMS I LBIDEC  /PRINT IT.
    TAD SP
    JMS PR3
    NOP
    NOP
    NOP
    JMS I 7
    FGET TEMP2
    FMPY M
    FADD B
    FDIV TEMP3
    FMPY TEMP4    /VITROLITE REFL.
    FNOP          /CAN BE REPLACED BY "INPUT" (0011) IF
                  /MANUAL ENTRY OF REFLECTANCES IS DESIRED.
    FPUT TEMP1    /REFLECTANCE (PER UNIT).
    FMPY D1000
    FNOP
    FEXT
/
/>>>JMP I CV<<<
    NOP
    JMS PRFAC     /PRINT %REFL (TIMES 10).
/
    JMS CRLF
    NOP
    NOP
    JMP I CV
DM6,-6
LB,B-1
SP,240
K300,300
LGCHAR,GCHAR+3
GCHAR,8           /THESE ARE THE GAINS.
    4
    2
    1
```

```
/
D1000,0012
    3720
    0000
GSTOR,0
/
/FIX THE FAC, PRINT THE HIGH ORDER PART (LOC 45) DECIMAL.
PRFAC,0
    JMS I LFIX
    JMS I LBIDEC
    JMP I PRFAC
VOLT,0  /PRINT A-D READINGS IN FLOATING NOTATION
    JMS I 7
    FGET TEMP1
    OUTPUT
    FGET TEMP2
    OUTPUT
    FEXT
    JMP I VOLT
PAUSE

/WAIT FOR "PROCEED" SIGNAL.
/UPPON ENTERING THIS SUBR.

/IF LOGIC LINE 1 (BIT 1) IS 0 (LINE GROUNDED) WAIT FOR IT
/TO GO TO 1 (LINE OPEN), THEN WAIT FOR IT TO GO TO 0.
/IF LOGIC LINE 1 IS ALREADY 1 WAIT FOR IT TO GO TO 0.
/LSO TIMES THE IDLE TIME BETWEEN STD READINGS
/AND CAUSES SIGNAL TO BE SENT IF TOO MUCH TIME IS TAKEN.
/IT SETS STDSAM TO INDICATE WHICH READING IS BEING TAKEN.
/UPON EXITING THIS SUBR. STDSAM'S CODE IS:
/STDSAM=0 FOR STD.
/STDSAM=1,2,3,4 FOR FOUR SAM READINGS.
*4400
WAIT0,0
    CLA CLL
    NOP
    NOP
    LOGIN       /READ LOGIC LINE.
    SKP
    JMP .-2     /NO, WAIT FOR IT TO OPEN.
    JMS WAIT2   /YES, WAIT FOR SWITCH BOUNCE.
    LOGIN
    JMP .-1
    NOP
    TAD STDSAM  /STD READING?
    SPA CLA  /IF SO STDSAM = -1
    JMS SET     /YES, CHECK STD FOR LIMITS.
                /NO.
    JMS CHKTIM  /CHECK TIME TO SEE IF IT HAS BEEN TOO LONG
                /SINCE STD READING.
    NOP
    NOP
    NOP
    ISZ STDSAM   /CHECK 1ST OR 2ND READING
    TAD D32   /SET INDEX REG ACCORDINGLY
    TAD LSAVE1  /REG FOR SAMPLE WILL BE INCREMENTED IN LOOP OF
    DCA AUTO1   /MAIN PROG
    NOP
CLA CLL
    JMS WAIT2  /WAIT FOR SWITCH BOUNCE
    JMP I WAIT0
/SET NO OF SECONDS FOR COMPLETING OPERATION
SET,0
    CLA CLL
    TAD KTIME
    DCA I LCMINS  /SET SECOND TIMER
    NL7777  /SET HMINS TO -1
    DCA I LHMINS
    JMP I SET
LHMINS,5576
LCMINS,5577
KTIME,-2260  /10 SECONDS
```

```
/CHECK OPERATOR TIME
CHKTIM,0000
    CLA CLL
    TAD I LHMINS
    SPA CLA     /IS TIME UP? IF SO, HMINS IS NONNEG.
    JMP I CHKTIM/NO, RETURN.
                /YES.
    NOP
    HUE SAT BRI /DISPLAY ALL ZEROS.
    JMS I LPIDEC/PRINT ZEROS.
    JMP I LSTART/RESTART.
LSTART,START
/
/
/WAIT FOR RELAYS (4.5*444=1998 MICROSEC.)
/OVERALL TIME=2007 MICROSEC.
/ALSO USED TO ELIMINATE SWITCH BOUNCE IN PROCEED SWITCH.
/RETURNS WITH AC=0.
WAIT2,0000
    TAD MD444
    DCA WTEMP
    ISZ WTEMP
    JMP .-1
    JMP I WAIT2
MD444,-674
WTEMP,0
/
/TEMPORARY OUTPUT ON TTY.
/PRINTS TRISTIMULUS VALUES.
TTOUT,0000
    JMS CHRSTR
    JMS I 7
    FGET TX
    OUTPUT      /TRIX.
    FGET TY
    OUTPUT      /TRIY.
    FGET TZ
    OUTPUT      /TRIZ.
    FEXT
    NOP
    JMP I TTOUT
/
/TRISTIMULUS SUMMATION.
TRIS,0000
    JMS I 7
    FGET TEMP1
    FMPY TEMP2
    FADD TX
    FPUT TX     /TRIX (SUBTOTAL)
    FGET TEMP1
    FMPY TEMP3
    FADD TY
    FPUT TY     /TRIY (SUBTOTAL)
    FGET TEMP1
    FMPY TEMP4
    FADD TZ
    FPUT TZ     /TRIZ (SUBTOTAL)
    FEXT
    JMP I TRIS
/
/
/DIODE CURVE COEFFICIENTS.
    *4000
/
/400
B1,0007;5663;2242
   0005;3007;2563
/420

*4600
/CHANNEL SELECTION, GAIN SETTING, AND MODE SETTING.
```

```
/MODE IS NON-INTERRUPT IF BIT 0=0.
/GAIN IS 1,2,4,OR 8 FOR BITS 4 & 5=0,1,2,3 RESP.
/CHANNEL NUMBER IS SET BY BITS 7-11.
/
/TO CHANGE GAINS:
/ADD 100 FOR GAIN OF 2
/    200            4
/
GAINS,0000/CHAN 0, GAIN 1, NON-INT.
      0001/CHAN 1,GAIN 1,NON-INT.
      0002
      0003
      0004
      0005
      0006
      0007
      0010
      0011
      0012
      0013
      0014
      0015
      0016
      0017
/
      *4620
/
/STORAGE FOR A-D READINGS.
/(STANDARD)
SAVE1,0
      PPAUSE/BLACK & VITROLITE REFLECTANCES

*1600
7774;3015;7323 /BLACK
7774;3004;0611
7774;2760;3366
7774;2751;7032
7774;2717;5255
7774;2714;3100
7774;2670;5653
7774;2674;0032
7774;2665;3476
7774;2645;0432
7774;2636;4076
7774;2641;6253
7774;2627;7542
7774;2636;4076
7774;2656;7143
7774;2714;3100
/
/VIT REFL WR BASO4 ATOBURG
VIT,0000
```

3511;0000 3511;5646

0000;3455;0344
0000;3434;5300
0000;3457;0651
0000;3461;1156
0000;3453;0041
0000;3455;0344

0000;3446;7226
0000;3442;6416
0000;3442;6416
0000;3430;4466
0000;3406;1116
0000;3402;0304
0000;3363;5543
0000;3363;5543

```
0000;3351;3614
/"FLAGSE"
/INTERRUPT ROUTINE FOR
/    POWER FAIL
/    CLOCK
/    A-D CONVERTER
/    KEYBOARD
/    PRINTER AND
/    SECOND TTY INTERFACE (DEV. CODES 40 AND 41).
/
/UNACCOUNTED FOR INTERRUPT RESULTS IN A HLT IN THE ROUTINE.
/
/WHEN TIMER=0, THE ROUTINE INITIATES THE OPERATION SPECIFIED
/BY "MODE". WHEN TIMER=FINTIM, CFLAG IS SET=0. THIS
/MEANS THAT IT IS TIME FOR THE SLACK TO BE TAKEN UP.
/
/IF POWER FAIL OPERATES, PROGRAM RESTARTS AT *200 WHEN
/POWER RETURNS.
/
    *0
    0000            /RETURN ADDRESS.
    JMP I 2         /JMP TO FLAGS TEST.
    FLAGS           /SA FOR FLAGS TEST.
    TIMER           /ADDR OF TIMER.
MODE,0000
/

/
    *5400
FINTIM,0
TIMER,0
/
FLAGS,DCA AC       /SAVE AC.
    GTF            /GET FLAGS FROM SAVE FIELD REGISTER.
    DCA SF         /SAVE THEM.
    SPL            /POWER LOW?
    JMP OTHERS     /NO, CHECK OTHER FLAGS.
    TAD K200       /YES, GET STARTING ADDR.OF PROG.
    DCA MODE       /USE "MODE" FOR POINTER.
    TAD CODE       /GET OP CODE TO PUT IN LOC 0.
    DCA 0          /THIS WILL CAUSE A "JMP I MODE" ON POWER ON.
    HLT
/
RESUME,CLA CLL
    TAD SF         /GET SAVE FIELD CONTENTS.
    RTF            /RESTORE THE FLAGS (INCLUDING LINK).
    CLA
    TAD AC         /RESTORE THE AC.
    JMP I 0        /RETURN TO PROGRAM.
/
AC,0
SF,0
K200,200
CODE,JMP I 4
/
OTHERS,CLSK        /CLOCK?
    SKP            /NO.
    JMP CLOCK      /YES.
    KSF            /KEYBOARD?
    SKP            /NO.
    JMP KEYBD      /YES.
    TSF            /PRINTER?
    SKP            /NO.
    JMP PRNTR      /YES.
    ADSF           /A-D CONVERTER?
    SKP            /NO.
    JMP ADCON      /YES.
    KSF+350        /SECOND KEYBOARD?
    SKP            /NO.
    JMP KB2        /YES.
    TSF+350        /SECOND PRINTER?
```

```
        HLT             /STRAY INTERRUPT
        JMP PR2         /YES.
/
/SERVICE THE CLOCK.
CLOCK,CLEI              /ENABLE CLOCK INTERRUPT.
        CLA CLL
        ISZ CMINS       /INCREMENT HALF MINUTE TIMER.
        SKP             /CMINS NOT 0.
        JMS HMIN        /CMINS = 0 SO SET TIME UP INDICATOR
        NOP
        NOP
        NOP
        NOP
        JMP RESUME      /EXIT FRO M ROUTINE
/TIME UP SET INDIC
HMIN,0
        CLA CLL
        DCA HMINS       /SET TO 0
        JMP I HMIN      /RETURN
/SERVICE THE KEYBOARD.
KEYBD,KRS               /READ KEYBOARD AND CLEAR FLAG.
        HLT             /THIS POINT SHOULD NOT BE REACHED.
/THE KIE INSTRUCTION IN IBALL SHOULD PREVENT IT.
        JMP RESUME
/
/SERVICE THE PRINTER.
PRNTR,TCF               /CLEAR FLAG.
        HLT
/THIS POINT SHOULD NOT BE REACHED.
        JMP RESUME
/
/SERVICE THE A-D CONVERTER.
ADCON,ADRB              /CLEAR FLAG.
        HLT
/THIS POINT SHOULD NOT BE REACHED IN THE NON-INTERRUPT MODE.
        JMP RESUME
/
/SERVICE SECOND KEYBOARD.
KB2,KRS+350
        HLT
        JMP RESUME
/
/SERVICE THE SECOND PRINTER.
PR2,TCF
        HLT
        JMP RESUME
/
/
/
        *5576
/*****DO NOT MOVE. SEE IBALL.
HMINS,0
CMINS,0
/*****
/
/"FLAGSE"
/4 SEPT 71

/"HSBE"
/
        *21
        TALLY2,0
/
/SUBROUTINE TO DETERMINE HUE,SAT,AND BRI
/FROM TRISTIMULUS VALUES.
/THIS ROUTINE ASSUMES THAT LOCATIONS ON PAGE 0
/TX,TY,AND TZ CONTAIN THE X,Y,AND Z TRISTIMULUS
/VALUES, AND THAT "AUTO1", AUTO8, "TEMP1", AND
/"TEMP4" ARE FREE.
/
```

```
        *7
        5600            /ENTRY TO FLOATING POINT INTERPRETER.
AUTO1,0                 /AUTOINDEX REGISTER.
AUTO2,0
AUTO3,0
AUTO4,0
AUTO5,0
AUTO6,0
AUTO7,0
AUTO8,0
/
        *25
/*****
M4,-4
/NOTE: THIS CORRESPONDS TO M4 IN IBALL. DO NOT MOVE.
/*****
/
        *33
/*****
LBIDEC,BIDEC
LOUT,7351
LOUTDIG,7357
/NOTE: DO NOT MOVE THESE.  SEE IBALL.
LFINTI,5400    /DO NOT MOVE. SEE FLAGS.
LFIX,FIX       /DO NOT MOVE.
/*****
/
/NOTE: LOCS 40-61 REQUIRED BY FLOAT3.
        *55
        7777    /CR AND LF AFTER FLOATING OUTPUT.
        7777    /LF AFTER CR ON FLOATING INPUT.
/
        *70
/*****
CRLF,0000
/NOTE: CRLF IS A SUBR. IN IBALL AT THIS LOCATION.
/*****
        *100
TEMP1,0
        0
        0
TEMP2,0
        0
        0
TEMP3,0
        0
        0
TEMP4,0
        0
        0
TX,0
        0
        0
TY,0
        0
        0
TZ,0
        0
        0
/
/*****
/NOTE: CHRSTR IS A SUBR. IN IBALL. DO NOT MOVE.
        *161
CHRSTR,0
/*****
/
        *400
/
HSB,0
        JMS I LSUB1
/SUB1 RETURNS X AND Y COORDS (SHIFTED FOR C-SOURCE)
/IN TX AND TY, THE SOURCE-COLOR VECTOR LENGTH IN TZ,
```

```
/THE COSINE OF THE ANGLE IN TEMP4, BRI IN TEMP1,
/AND THE AC CLEARED.
     TAD LLIST   /LIST OF ADDRESSES OF COSINE-DISTANCE TABLES.
     DCA LPTR
     TAD TX+1
     SPA CLA     /IS X POSITIVE?
     JMP .+3     /NO. DON'T INCREMENT LPTR.
     ISZ LPTR    /YES. INCREMENT LPTR TO
     ISZ LPTR    /THIRD ENTRY OF LIST.
     TAD TY+1
     SPA CLA     /IS Y POSITIVE?
     ISZ LPTR    /NO. INCREMENT LPTR TO NEXT ENTRY.
                 /YES. DON'T INCREMENT LPTR.
/NOTE: IF X>0 ENTRY IS 3 OR 4, ELSE 1 OR 2.
/      IF Y>0 ENTRY IS 1 OR 3, ELSE 2 OR 4.
/THUS QUAD I TABLE ADDR IS ENTRY 3
/     QUAD II TABLE ADDR IS ENTRY 1
/     QUAD III TABLE ADDR IS ENTRY 2
/     QUAD IV TABLE ADDR IS ENTRY 4.
/
     TAD I LPTR  /GET STARTING ADDR (LESS 1).
     DCA AUTO1
     CDF+10      /CHANGE TO DATA FIELD 1.
     TAD I AUTO1 /GET MINUS ENTRY COUNT.
     DCA TALLY2  /SET TALLY2.
     TAD TALLY2
     CIA
     DCA COUNT   /COUNT=ENTRY COUNT.
     TAD I AUTO1 /GET STARTING WAVELENGTH.
     DCA BLOCK   /STORE IT (BLOCK IS TEMP STORAGE).
     TAD I AUTO1 /GET "OPCODE" FROM TABLE.
     DCA OPCODE
LOOP,CDF+10      /CHANGE TO DATA FIELD 1.
/
/READ A COSINE FROM THE TABLE AND PUT IT IN FAC.
     TAD I AUTO1
     DCA 44
     TAD I AUTO1
     DCA 45
     TAD I AUTO1
     DCA 46
/
     CDF         /CHANGE TO DATA FIELD 0.
     JMS I 7
/NOTE: COSINE FROM TABLE IS ALREADY IN THE FAC.
     FSUB TEMP4  /TABULAR VALUE-CALC. VAL OF COSINE
     FEXT        /THE DIFFERENCE IS IN FAC (LOCS 44,45,46).
     TAD 45      /H.O. PART OF DIFFERENCE.
     SPA SNA CLA /FOUND DESIRED COSINE?
     JMP DWL     /YES, CALC DOMINANT WAVELENGTH.
     ISZ TALLY2  /NO, IS LIST EXHAUSTED?
     JMP LOOP    /NO, READ ANOTHER.
                 /YES, CALC DOM. W.L.
DWL,TAD COUNT    /AC=NUMBER OF ENTRIES IN THE LIST.
     TAD TALLY2  /AC=NUMBER OF ENTRIES CHECKED.
OPCODE,7000      /"NOP" FOR II OR IV, "CIA" FOR I OR III.
/NOTE: SINCE I AND III START WITH LONG WAVELENGTHS,
/     AND SINCE II AND IV START WITH SHORT WAVELENGTHS,
/     WHETHER WE WANT TO ADD OR SUBTRACT THE NUMBER
/     OF ENTRIES CHECKED FROM THE STARTING WAVELENGTH
/     DEPENDS ON THE QUADRANT.
/
     TAD BLOCK   /AC=D.W.L. (NOT ADJUSTED FOR NONSPEC.)
     DCA BLOCK
     JMS CHRSTR  /PRINT "(CR)(LF)HUE=".
     TAD BLOCK   /NOW BLOCK AND AC BOTH = D.W.L. (NOT ADJ.)
/
/CONVERT WAVELENGTH CODE TO WAVELENGTH AND PRINT.
     CIA
     TAD D700    /700 (10)-W.L.
     SMA         /IS W.L.>700 (10)?
     JMP LOW     /NO, CHECK OTHER END.
```

```
        TAD D176   /YES, ADJUST IT FOR NONSPECT. NUMBERS.
        JMP GO+2
LOW,CLA
        TAD BLOCK
        CIA
        TAD D400   /400 (10)-W.L.
        SPA SNA    /IS W.L. LESS THAN 400 (10)?
        JMP GO     /NO, PRINT IT.
        TAD D99    /YES, ADJUST IT TO NONSPECT. NUMBERS.
        JMP GO+2
GO,CLA
        TAD BLOCK
        JMS I LBIDEC/PRINT HUE
        TAD I LDISPL  /GET HUE BCD NUMBER.
        HUE           /DISPLAY IT.
        JMS CHRSTR /PRINT "(CR)(LF)SAT=".
/
        CLA CLL
        TAD ADDON  /NUMBER OF LOCS FROM COS TO DIS ENTRY.
        NOP
        TAD AUTO1  /AC=LOC OF DESIRED ENTRY IN "DISTANCE" LIST.
        DCA AUTO1
        CDF+10     /CHANGE TO DATA FIELD 1.
/READ DISTANCE FROM TABLE AND PUT IT IN TX.
        TAD I AUTO1
        DCA TX
        TAD I AUTO1
        DCA TX+1
        TAD I AUTO1
        DCA TX+2
/
        CDF           /CHANGE TO DATA FIELD 0.
        JMS I 7
        FGET TZ    /SOURCE-COLOR DIST.
        FDIV TX    /SOURCE-SPECTRAL LOCUS DIST.
        FMPY FD1000
        FPUT TZ
        OUTPUT        /PRINT SAT (FLOATING).
        FGET TZ
        FEXT
        JMS I LFIX
        JMS I LBIDEC/PRINT SAT (FIXED).
        TAD I LDISPL  /GET SAT BCD NUMBER.
        SAT           /DISPLAY IT.
        JMS CHRSTR /PRINT "(CR)(LF)BRI=".
        JMS I 7
        FGET TEMP1
        OUTPUT        /PRINT BRI (FLOATING).
        FGET TEMP1
        FEXT
        JMS I LFIX
        JMS I LBIDEC/PRINT BRI (FIXED).
        TAD I LDISPL  /GET BRI BCD NUMBER.
        BRI           /DISPLAY IT.
        JMP I HSB
LSUB1,SUB1
LPTR,0
LLIST,LIST
LDISPL,DISPLA
/*****
/NOTE: THE FOLLOWING BLOCK NUMBERS ARE ABSOLUTE ADDRESSES
/      FOR THE TABLES IN FIELD 1. THEY MUST BE CHANGED
/      IF THE TABLES ARE MOVED. NOTE ALSO THAT THE DISTANCE
/      TABLES TAKE AN ADDITIONAL 11 (8) BLOCKS IN FIELD 1.
/      THUS, A TOTAL OF 22 (8) BLOCKS IS USED FOR TABLES
/      TAKING LOCS 200-4777 IN FIELD 1.
/*****
LIST,546   /COS TABLE 2, LOCS 547-1035.
     1035  /COS TABLE 3, LOCS 1036-1525.
     0177  /COS TABLE 1, LOCS 200-546.
     1525  /COS TABLE 4, LOCS 1526-2366.
     1777  /TABLE 3, 5 PAGES, LOCS 2000-3177.
```

```
    0177 /TABLE 1, 4 PAGES, LOCS 0200-1177.
    3177 /TABLE 4, 7 PAGES, LOCS 3200-4777.
/
BLOCK,0
COUNT,0
FD1000,0012   /1000 (10) FLOATING.
    3710
    0000
D700,1274
D400,620
D99,143
D176,260
ADDON,2200-3
/
/
    *600
SUB1,0000
/SUB1 RETURNS X AND Y COORDS (SHIFTED FOR C-SOURCE)
/IN TX AND TY, THE SOURCE-COLOR VECTOR LENGTH IN TZ,
/THE COSINE OF THE ANGLE IN TEMP4, BRI IN TEMP1,
/AND THE AC CLEARED.
    JMS CHRSTR  /PRINT "(CR)(LF)CHROM. COORDS.(CR)(LF)".
    JMS I 7
    FGET TY
    FMPY I L2D10/ 10 (10) IN F.P.P.
    FPUT TEMP1/BRI=10*TY.
    FGET TX
    FADD TY
    FADD TZ
    FPUT TZ    /TZ CONTAINS SUM OF TRIS. VALUES.
    FGET TX
    FDIV TZ    /X CHROMATICITY COORDINATE (XCROM).
    FPUT TX
    OUTPUT     /PRINT XCROM.
    FGET TX
    FSUB P3101/CHANGE OF AXIS TO C SOURCE.
    FPUT TX    /TX CONTAINS X.
    SQUARE     /XSQUARE.
    FPUT TEMP4/TEMP4 CONTAINS (XSQ).
    FGET TY
    FDIV TZ    /Y CHROM. COORD. (YCROM).
    FPUT TY
    OUTPUT     /PRINT YCROM.
    FGET TY
    FSUB P3163/CHANGE OF AXIS TO C SOURCE.
    FPUT TY    /TY CONTAINS Y.
    SQUARE     /YSQUARE.
    FPUT TEMP3/TEMP3 CONTAINS (YSQ).
    FADD TEMP4/(XSQ+YSQ).
    SQROOT     /SOURCE TO COLOR DISTANCE.
    FPUT TZ    /SAVE IT IN TZ.
    FGET TX
    FDIV TZ    /COSINE OF ANGLE.
    FPUT TEMP4
    FEXT
    TAD TEMP4+1
    SMA CLA    /IS COSINE NEGATIVE?
    JMP I SUB1/NO, CONTINUE.
    JMS I 7    /YES, TAKE ABSOLUTE VALUE.
    FGET TEMP4
    NEGATE
    FPUT TEMP4
    FEXT
    JMP I SUB1
P3101,7777    /0.3101 FLOATING.
    2366
    1266
P3163,7777    /0.3163 FLOATING.
    2417
    4412
/*****
/NOTE: ABSOLUTE ADDRESS.
```

```
L2D10,7470    /LOC OF 10 (10) IN F.P.P.
/*****
/
/
/FIX THE FLOATING POINT NUMBER IN FAC (44,45,46).
FIX,0000
      CLA CLL
      TAD 44
      TAD M13
      SPA
      JMP RORITE
      SZA
      JMP ROLEFT
      CLA CLL
      TAD 45
      CLL RAR
      ISZ TALLY2
      JMP .-2
      JMP I FIX
ROLEFT,CIA
      DCA TALLY2
      CLA CLL
LPROL,TAD 46
      CLL RAL
      DCA 46
      TAD 45
      RAL
      DCA 45
      ISZ TALLY2
      JMP LPROL
      TAD 45
      JMP I FIX
M13,-13
/
/CONVERT BINARY NUMBER IN AC TO DECIMAL EQUIV. AND PRINT.
BIDEC,0000
      MQL           /SAVE AC IN MQ.
      NOP
      TAD M4
      DCA TALLY2
      DCA DISPLA
      TAD LPR10
      DCA AUTO8     /POINTER TO LIST OF (-) POWERS OF TEN.
LOOP4,TAD I AUTO8
      DCA COMP      /COMPARISON NUMBER.
      DCA COUNT2
LOOP5,CLA CLL
      MQA           /GET THE BINARY NUMBER.
      TAD COMP      /COMPARE WITH 10↑I, I=4,3,2,1.
      SNL           /IS NUMBER>=10↑I?
      JMP NEXT      /NO, PRINT COUNT2.
      MQL           /YES, SAVE RESULT AND
      ISZ COUNT2    /INCREMENT COUNT.
      JMP LOOP5     /TRY SAME COMP AGAIN.
NEXT,CLA
      TAD DISPLA    /GET DISPLAY NUMBER.
      CLL RAL       /ROTATE 4 LEFT.
      CLL RAL
      CLL RAL
      CLL RAL
/NOTE THAT BY THIS PROCESS, THE 1000'S DIGIT WILL BE LOST
/WHEN THE 1'S DIGIT IS FINALLY ADDED.
      TAD COUNT2    /ADD LATEST DIGIT.
      DCA DISPLA    /SAVE IT.
      TAD COUNT2    /GET LATEST DIGIT.
      JMS I LOUTDI  /PRINT IT..
      ISZ TALLY2    /DONE 4 DIGITS?
      JMP LOOP4     /NO, DO ANOTHER.
      JMP I BIDEC
/
LPR10,PR10-1
```

```
PR10,-1750      /-1000  (10).
    -144        /-100   (10).
    -12         /-10    (10).
    -1          /-1     (10).
COMP,0
COUNT2,0
DISPLA,0
/"HSBE"
/"MC8RBTS72"    /"CONSTS-2"
/LOCS 5000 5217 /14 SEPT 71
/WEIGHTED FACTORS FOR X,Y,Z

*5000
/X1  .14305
X1,7776;2223;6731
/Y1  .01129
7772;2707;6330
/Z1  .58166
0000;2247;1725
/X2  3.59965
0002;3463;0124
/Y2  .37354
7777;2772;0120
/Z2  17.20291
0005;2114;7710
/X3  7.67668
0003;3655;1656
/Y3  1.25426
0001;2404;2713
/Z3  39.42572
0006;2355;4770
/X4  6.34171
0003;3127;3643
/Y4  2.73667
0002;2571;1315
/Z4  36.81888
0006;2232;1505
/X5  1.84075
0001;3534;7331
/Y5  5.35341
0003;2532;3620
/Z5  17.0095
0005;2100;4672
/X6 .06137
7774;3732;7614
/Y6  8.76754
0004;2142;1754
/Z6  4.15811
0003;2050;3636
/X7  1.96136
0001;3730;3354
/Y7  12.61375
0004;3116;4372
/Z7  .92538
0000;3547;1331
/X8  6.56721
0003;3221;1511
/Y8  16.6452
0005;2051;2256
/Z8  .22128
7776;3424;5634
/X9  12.64059
0004;3121;7756
/Y9  17.62899
0005;2150;2026
/Z9  .00422
7771;2122;1766
/Z10  16.99009
0005;2077;2732
/Y10  14.60867
0004;3515;7214
/Z10 -.00224
```

```
7770;5551;4605
/X11 17.1875
0005;2114;0000
/Y11 10.09755
0004;2414;3710
/Z11 0
0000;0000;0000
/X12 12.856
0004;3155;4426
/Y12 5.99006
0003;2775;3511
/Z12 0
0000;0000;0000
/X13 6.57762
0003;3223;6756
/Y13 2.73548
0002;2570;4415
/Z13 0
0000;0000;0000
/X14 2.29485
0002;2226;7551
/Y14 .89941
0000;3461;7734
/Z14 0
0000;0000;0000
/X15 .60524
0000;2327;4201
/Y15 .23475
7776;3603;0446
/Z15 0
0000;0000;0000
/X16 .12746
7776;2024;1160
/Y16 .04941
7774;3123;0422
/Z16 0
0000;0000;0000
*4522
TELTYP,JMS READD   /READ TT
       TAD HOLD    /GET CHAR
       TAD DOLLAR
       SNA CLA     /WAS IT $
       JMP S2      /YES
       TAD HOLD    /NO
       TAD QUES
       SNA CLA     /WAS IT ?
       JMP S1      /YES
       JMP 4410    /NO  NOT RIGHT CHAR SO RETURN
    S1,TAD HOLD    /PRINT ?
       JMS I LOUT
       JMP END
    S2,TAD STRING
       DCA PTR     /RESET POINTER
    S3,TAD HOLD
       DCA I PTR   /PUT CHAR IN STRING
       TAD PTR     /CHECK FOR TOO MANY DIGITS ENTERED
       TAD CNTR    /WILL PRIT DIGITS BUT WILL NOT STOER IN PROG
       SZA CLA
       ISZ PTR
       TAD HOLD    /GET CHAR
       JMS I LOUT  /PRINT T
       JMS READD   /READ TT AGAIN
       TAD HOLD    /CHECK FOR CR
       TAD CR
       SNA CLA
       JMP .+2
       JMP S3
       NL0003
       TAD PTR
       DCA PTR     /SET PTR FOR REST OF STRING
   END,JMS 70      /GO TO CR LF SUB
       JMP 4410
       NOP
```

```
READD,0
    KSF
    JMP .-1
    KRB
    DCA HOLD
    JMP I READD
DOLLAR,-244
QUES,-277
CR,-215
CNTR,-1123
HOLD,0
*34
LOUT,7351
*175
PTR,0
STRING,1115
PAUSE
```

The following values define the well known CIE chromaticity diagram and are stored in computer memory in the usual floating point format. The chromaticity diagram is further discussed in Billmyer and Saltzman, Principles of Color Technology, 1966. The first set of columns define for each of the four quadrants the cosine of the angle between a line through the well known point for illuminant C extending parallel to the $x$ axis and a line through the illuminant point C and the point of the curve. The numbers in the first column represent the exponent while the numbers in the second and third columns represent the mantissa. The second set of columns define the distance from C to the point on the chromaticity curve.

```
/COS-I
/
    *200
START1,-114    /-76 (10) MINUS ENTRY COUNT.
    1154       /620 (10) STARTING WAVELENGTH.
    CIA        /SEE LOC "OPCODE" IN "HSB" SUBR.

0000 ;3777 ;7655
    0000 ;3777 ;7260
    0000 ;3777 ;6415
    0000 ;3777 ;5157
    0000 ;3777 ;3177
    0000 ;3777 ;0752
    0000 ;3776 ;5263
    0000 ;3776 ;0773
    0000 ;3775 ;3537
    0000 ;3774 ;5353
    0000 ;3773 ;6325
    0000 ;3772 ;4575
    0000 ;3771 ;1612
    0000 ;3777 ;5367
    0000 ;3765 ;7435
    0000 ;3764 ;0120
    0000 ;3761 ;4000
    0000 ;3756 ;5560
    0000 ;3753 ;4642
    0000 ;3750 ;1352
    0000 ;3744 ;3505
    0000 ;3737 ;5625
    0000 ;3732 ;4005
    0000 ;3724 ;6355
    0000 ;3716 ;4520
    0000 ;3707 ;6453
    0000 ;3677 ;3575
    0000 ;3666 ;2527
    0000 ;3654 ;3152
    0000 ;3641 ;5267
    0000 ;3626 ;0352
    0000 ;3607 ;6060
    0000 ;3570 ;2043
    0000 ;3547 ;4155
    0000 ;3525 ;4020
    0000 ;3502 ;1420
    0000 ;3453 ;4642
    0000 ;3423 ;3245
    0000 ;3371 ;4310
    0000 ;3336 ;0265
    0000 ;3300 ;6702
    0000 ;3237 ;3375
    0000 ;3174 ;0552
    0000 ;3126 ;6661
    0000 ;3057 ;6442
    0000 ;3007 ;0272
    0000 ;2732 ;1702
    0000 ;2653 ;5506
    0000 ;2573 ;4742
    0000 ;2512 ;1063
    0000 ;2427 ;3212
    0000 ;2341 ;0341
    0000 ;2251 ;6170
    0000 ;2161 ;6104
    0000 ;2071 ;2061
    0000 ;2000 ;3465
    7777 ;3615 ;0150
    7777 ;3431 ;3372
    7777 ;3246 ;3542
    7777 ;3064 ;3604
    7777 ;2703 ;6756
    7777 ;2524 ;3012
    7777 ;2346 ;6114
    7777 ;2173 ;1253
    7777 ;2021 ;6675
    7776 ;3525 ;6642
    7776 ;3211 ;1047
    7776 ;2701 ;4473
    7776 ;2377 ;2603
    7776 ;2102 ;4116
    7775 ;3426 ;4163
    7775 ;2661 ;6623
    7775 ;2130 ;1126
    7774 ;3022 ;1373
    7773 ;3423 ;3245
    7772 ;2130 ;6322

/
/COS-II
START2,-74     /-60 (10) MINUS ENTRY COUNT.
    745        /485 (10) STARTING WAVELENGTH.
    NOP        /SEE "OPCODE" IN "HSB" SUBR.

0000 ;3776 ;1203
    0000 ;3760 ;1263
    0000 ;3726 ;2600
    0000 ;3663 ;1340
    0000 ;3611 ;1442
    0000 ;3532 ;5120
    0000 ;3441 ;6523
    0000 ;3346 ;4655
    0000 ;3252 ;4623
    0000 ;3157 ;0652
    0000 ;3065 ;0136
    0000 ;2774 ;6612
    0000 ;2706 ;1636
    0000 ;2621 ;3777
    0000 ;2536 ;6721
    0000 ;2456 ;3455
    0000 ;2405 ;0233
    0000 ;2334 ;4042
    0000 ;2264 ;7272
    0000 ;2216 ;2541
    0000 ;2150 ;6150
    0000 ;2107 ;7444
    0000 ;2047 ;3165
    0000 ;2007 ;1260
```

```
 7777 ;3716 ;4643
 7777 ;3617 ;4660
 7777 ;3535 ;2352
 7777 ;3452 ;4103
 7777 ;3367 ;2152
 7777 ;3303 ;4530
 7777 ;3217 ;3672
 7777 ;3140 ;6756
 7777 ;3061 ;1677
 7777 ;3000 ;4455
 7777 ;2716 ;6622
 7777 ;2634 ;0354
 7777 ;2554 ;3276
 7777 ;2473 ;3355
 7777 ;2411 ;0326
 7777 ;2325 ;1716
 7777 ;2237 ;7726
 7777 ;2155 ;3707
 7777 ;2071 ;2331
 7777 ;2003 ;2425
 7776 ;3627 ;0370
 7776 ;3443 ;5572
 7776 ;3273 ;2633
 7776 ;3117 ;4266
 7776 ;2740 ;1561
 7776 ;2555 ;1461
 7776 ;2366 ;3246
 7776 ;2202 ;5752
 7776 ;2013 ;0362
 7775 ;3436 ;5605
 7775 ;3036 ;6325
 7775 ;2426 ;2774
 7775 ;2011 ;1315
 7774 ;2745 ;2266
 7773 ;3511 ;6367
 7772 ;2504 ;5662

/
/COS-III
START3,-147  /-103 (10) MINUS ENTRY COUNT.
     744     /484 (10) STARTING WAVELENGTH
     CIA     /SEE "OPCODE" IN "HSB2 SUBR.

0000 ;3776 ;7117
 0000 ;3763 ;4305
 0000 ;3733 ;0732
 0000 ;3665 ;2237
 0000 ;3602 ;4512
 0000 ;3526 ;2600
 0000 ;3444 ;2520
 0000 ;3355 ;2325
 0000 ;3262 ;0602
 0000 ;3163 ;4700
 0000 ;3103 ;4531
 0000 ;3022 ;2756
 0000 ;2740 ;2300
 0000 ;2655 ;5416
 0000 ;2572 ;6555
 0000 ;2531 ;4112
 0000 ;2470 ;1450
 0000 ;2426 ;7130
 0000 ;2365 ;5456
 0000 ;2324 ;5242
 0000 ;2300 ;0000
 0000 ;2253 ;3133
 0000 ;2226 ;7130
 0000 ;2202 ;3646
 0000 ;2156 ;1353
 0000 ;2137 ;3252
 0000 ;2120 ;5542
 0000 ;2102 ;0430
 0000 ;2063 ;3711
 0000 ;2044 ;7711
 0000 ;2033 ;1055
 0000 ;2021 ;2467
 0000 ;2007 ;4225
 7777 ;3773 ;4220
 7777 ;3750 ;0505
 7777 ;3730 ;5065
 7777 ;3711 ;1712
 7777 ;3671 ;6537
 7777 ;3652 ;3635
 7777 ;3633 ;1202
 7777 ;3617 ;4660
 7777 ;3604 ;0612
 7777 ;3570 ;4272
 7777 ;3555 ;0472
 7777 ;3541 ;4422
 7777 ;3527 ;7667
 7777 ;3516 ;3135
 7777 ;3504 ;6652
 7777 ;3473 ;2120
 7777 ;3461 ;5635
 7777 ;3451 ;7427
 7777 ;3442 ;1473
 7777 ;3432 ;3267
 7777 ;3422 ;5060
 7777 ;3412 ;7123
 7777 ;3403 ;3667
 7777 ;3374 ;0675
 7777 ;3364 ;5435
 7777 ;3355 ;2447
 7777 ;3345 ;7212
 7777 ;3337 ;5353
 7777 ;3331 ;3247
 7777 ;3323 ;1142
 7777 ;3314 ;7303
 7777 ;3306 ;5177
 7777 ;3301 ;1775
 7777 ;3273 ;6325
 7777 ;3266 ;3120
 7777 ;3260 ;7450
 7777 ;3253 ;3777
 7777 ;3247 ;0217
 7777 ;3242 ;4437
 7777 ;3236 ;0660
 7777 ;3231 ;4632
 7777 ;3225 ;0602
 7777 ;3222 ;0402
 7777 ;3216 ;7733
 7777 ;3213 ;7537
 7777 ;3210 ;7067
 7777 ;3205 ;6420
 7777 ;3203 ;2675
 7777 ;3200 ;7423
 7777 ;3176 ;3700
 7777 ;3174 ;0157
 7777 ;3171 ;4433
 7777 ;3070 ;7363
 7777 ;2703 ;7476
 7777 ;2544 ;6577
 7777 ;2377 ;7012
 7777 ;2224 ;6105
 7777 ;2043 ;0645
 7776 ;3525 ;3425
 7776 ;3242 ;6665
 7776 ;2750 ;5702
 7776 ;2446 ;6510
 7776 ;2134 ;7653
 7775 ;3426 ;2723
 7775 ;2726 ;3046
 7775 ;2216 ;6746
 7774 ;3177 ;2333
 7773 ;3643 ;4603
 7772 ;2130 ;6322
 7772 ;2154 ;3545
```

/
/COS-IV
START4,-212  /-138 (10) MINUS ENTRY COUNT.
   1155     /621 (10) STARTING WAVELENGTH.
   NOP      /SEE "OPCODE" IN "HSB" SUBR.

```
0000 ;3777 ;7655
0000 ;3777 ;7532
0000 ;3777 ;7260
0000 ;3777 ;6540
0000 ;3777 ;5677
0000 ;3777 ;4705
0000 ;3777 ;3720
0000 ;3777 ;2730
0000 ;3777 ;1470
0000 ;3777 ;0233
0000 ;3776 ;6647
0000 ;3776 ;5140
0000 ;3776 ;3432
0000 ;3776 ;1577
0000 ;3775 ;7743
0000 ;3775 ;6112
0000 ;3775 ;4257
0000 ;3775 ;2300
0000 ;3775 ;0175
0000 ;3774 ;6217
0000 ;3774 ;4237
0000 ;3774 ;2260
0000 ;3774 ;0302
0000 ;3773 ;6200
0000 ;3773 ;4075
0000 ;3773 ;2243
0000 ;3773 ;0410
0000 ;3772 ;6557
0000 ;3772 ;4575
0000 ;3772 ;2620
0000 ;3772 ;1630
0000 ;3772 ;0515
0000 ;3771 ;7527
0000 ;3771 ;6413
0000 ;3771 ;5422
0000 ;3771 ;4560
0000 ;3771 ;4042
0000 ;3771 ;3320
0000 ;3771 ;2457
0000 ;3771 ;1737
0000 ;3771 ;1217
0000 ;3771 ;0477
0000 ;3770 ;7760
0000 ;3770 ;7240
0000 ;3770 ;6520
0000 ;3770 ;6125
0000 ;3770 ;5532
0000 ;3770 ;5135
0000 ;3770 ;4543
0000 ;3770 ;4145
0000 ;3770 ;3552
0000 ;3770 ;3303
0000 ;3770 ;3035
0000 ;3770 ;2563
0000 ;3770 ;2170
0000 ;3770 ;1720
0000 ;3770 ;1450
0000 ;3770 ;1177
0000 ;3770 ;1053
0000 ;3770 ;0603
0000 ;3770 ;0460
0000 ;3770 ;0335
0000 ;3770 ;0210
0000 ;3770 ;0065
0000 ;3770 ;0065
0000 ;3767 ;7742
0000 ;3767 ;7615
0000 ;3767 ;7470
0000 ;3767 ;7470
0000 ;3767 ;7343
0000 ;3767 ;7222
0000 ;3767 ;7222
0000 ;3767 ;7075
0000 ;3767 ;7075
0000 ;3767 ;6752
0000 ;3767 ;6752
0000 ;3767 ;6752
0000 ;3767 ;6625
0000 ;3767 ;6625
0000 ;3761 ;5240
0000 ;3733 ;6003
0000 ;3666 ;7060
0000 ;3612 ;3435
0000 ;3531 ;6610
0000 ;3461 ;4000
0000 ;3401 ;1652
0000 ;3307 ;6600
0000 ;3204 ;1725
0000 ;3065 ;2363
0000 ;3007 ;6206
0000 ;2726 ;7255
0000 ;2642 ;5302
0000 ;2553 ;0434
0000 ;2460 ;1014
0000 ;2412 ;4302
0000 ;2343 ;5715
0000 ;2273 ;5730
0000 ;2222 ;4341
0000 ;2150 ;2214
0000 ;2111 ;1045
0000 ;2051 ;3741
0000 ;2011 ;3150
7777 ;3721 ;6030
7777 ;3617 ;7110
7777 ;3535 ;5567
7777 ;3453 ;1300
7777 ;3370 ;1575
7777 ;3304 ;7640
7777 ;3221 ;3210
7777 ;3140 ;5766
7777 ;3057 ;7306
7777 ;2776 ;7117
7777 ;2715 ;6210
7777 ;2634 ;4042
7777 ;2574 ;1146
7777 ;2533 ;5262
7777 ;2473 ;1377
7777 ;2432 ;4774
7777 ;2371 ;7651
7777 ;2261 ;3654
7777 ;2150 ;7410
7777 ;2040 ;4133
7776 ;3660 ;4233
7776 ;3440 ;3415
7776 ;3261 ;0170
7776 ;3101 ;7442
7776 ;2723 ;1411
7776 ;2544 ;6577
7776 ;2366 ;7202
7776 ;2170 ;6000
7775 ;3767 ;2420
7775 ;3377 ;3323
7775 ;3012 ;1210
7775 ;2427 ;2616
7774 ;3736 ;7570
7774 ;3625 ;7756
7773 ;3251 ;1763
```
END1,0
/
/

```
*2400
/DIS-I
START5,0;0;0  /THREE DUMMY LOCATIONS.
     7777  ;2766  ;1266
     7777  ;2756  ;2612
     7777  ;2746  ;4406
     7777  ;2736  ;6451
     7777  ;2727  ;0763
     7777  ;2717  ;3546
     7777  ;2706  ;0252
     7777  ;2674  ;5227
     7777  ;2663  ;3172
     7777  ;2652  ;1406
     7777  ;2641  ;0340
     7777  ;2626  ;2204
     7777  ;2613  ;5306
     7777  ;2601  ;1132
     7777  ;2566  ;5744
     7777  ;2554  ;3546
     7777  ;2540  ;4257
     7777  ;2524  ;6500
     7777  ;2511  ;1711
     7777  ;2475  ;6627
     7777  ;2462  ;5006
     7777  ;2445  ;7606
     7777  ;2431  ;4112
     7777  ;2415  ;2376
     7777  ;2401  ;3110
     7777  ;2365  ;6051
     7777  ;2350  ;6421
     7777  ;2334  ;2206
     7777  ;2320  ;0742
     7777  ;2304  ;2714
     7777  ;2270  ;7633
     7777  ;2254  ;4141
     7777  ;2240  ;5123
     7777  ;2225  ;2562
     7777  ;2212  ;4675
     7777  ;2200  ;3736
     7777  ;2166  ;1266
     7777  ;2154  ;5005
     7777  ;2143  ;6435
     7777  ;2133  ;6522
     7777  ;2124  ;5241
     7777  ;2115  ;6457
     7777  ;2110  ;0036
     7777  ;2103  ;1311
     7777  ;2077  ;2460
     7777  ;2074  ;4236
     7777  ;2072  ;5441
     7777  ;2072  ;0245
     7777  ;2072  ;4201
     7777  ;2074  ;1271
     7777  ;2076  ;7761
     7777  ;2103  ;1311
     7777  ;2110  ;4515
     7777  ;2117  ;2036
     7777  ;2127  ;0514
     7777  ;2140  ;1042
     7777  ;2152  ;4230
     7777  ;2166  ;0546
     7777  ;2202  ;5752
     7777  ;2220  ;4033
     7777  ;2237  ;2532
     7777  ;2256  ;6673
     7777  ;2277  ;2730
     7777  ;2320  ;6406
     7777  ;2343  ;1241
     7777  ;2366  ;2776
     7777  ;2411  ;6762
     7777  ;2436  ;1400
     7777  ;2463  ;2202
     7777  ;2511  ;1171

—Continued
     7777  ;2537  ;5354
     7777  ;2566  ;2526
     7777  ;2615  ;5074
     7777  ;2645  ;4117
     7777  ;2676  ;0067
     7777  ;2727  ;0514
/

/DIS-II
START6,0;0;0  /THREE DUMMY LOCATIONS.
     7777  ;2075  ;7616
     7777  ;2131  ;3246
     7777  ;2174  ;0156
     7777  ;2245  ;0432
     7777  ;2324  ;0045
     7777  ;2410  ;1153
     7777  ;3127  ;0244
     7777  ;3074  ;3771
     7777  ;3042  ;3202
     7777  ;3010  ;6350
     7777  ;2757  ;5202
/

/DIS-III
START7,0;0;0  /THREE DUMMY LOCATIONS.
     7777  ;2046  ;7477
     7777  ;2026  ;1215
     7777  ;2013  ;6545
     7777  ;2010  ;1672
     7777  ;2013  ;2611
     7777  ;2017  ;2162
     7777  ;2026  ;5421
     7777  ;2041  ;4025
     7777  ;2057  ;5056
     7777  ;2100  ;7276
     7777  ;2115  ;1012
     7777  ;2132  ;7346
     7777  ;2152  ;2251
     7777  ;2173  ;1253
     7777  ;2215  ;3365
     7777  ;2230  ;1772
     7777  ;2243  ;5052
     7777  ;2257  ;4607
     7777  ;2274  ;0302
     7777  ;2311  ;0202
     7777  ;2320  ;7126
     7777  ;2330  ;7312
     7777  ;2341  ;1205
     7777  ;2351  ;4605
     7777  ;2362  ;1445
     7777  ;2370  ;3302
     7777  ;2376  ;5657
     7777  ;2405  ;0753
     7777  ;2413  ;5036
     7777  ;2422  ;1373
     7777  ;2426  ;1734
     7777  ;2432  ;2276
     7777  ;2436  ;3110
     7777  ;2442  ;4167
     7777  ;2446  ;5521
     7777  ;2451  ;3742
     7777  ;2454  ;2432
     7777  ;2457  ;1122
     7777  ;2462  ;0062
     7777  ;2464  ;7272
     7777  ;2466  ;4627
     7777  ;3127  ;0244
     7777  ;3074  ;3771
     7777  ;3042  ;3202
     7777  ;3010  ;6350
     7777  ;2757  ;5202
/
```

/DIS-III
START7,0;0;0  /THREE DUMMY LOCATIONS.
```
    7777 ;2046 ;7477
    7777 ;2026 ;1215
    7777 ;2013 ;6545
    7777 ;2010 ;1672
    7777 ;2013 ;2611
    7777 ;2017 ;2162
    7777 ;2026 ;5421
    7777 ;2041 ;4025
    7777 ;2057 ;5056
    7777 ;2100 ;7276
    7777 ;2115 ;1012
    7777 ;2132 ;7346
    7777 ;2152 ;2251
    7777 ;2173 ;1253
    7777 ;2215 ;3365
    7777 ;2230 ;1772
    7777 ;2243 ;5052
    7777 ;2257 ;4607
    7777 ;2274 ;0302
    7777 ;2311 ;0202
    7777 ;2320 ;7126
    7777 ;2330 ;7312
    7777 ;2341 ;1205
    7777 ;2351 ;4605
    7777 ;2362 ;1445
    7777 ;2370 ;3302
    7777 ;2376 ;5657
    7777 ;2405 ;0753
    7777 ;2413 ;5036
    7777 ;2422 ;1373
    7777 ;2426 ;1734
    7777 ;2432 ;2276
    7777 ;2436 ;3110
    7777 ;2442 ;4167
    7777 ;2446 ;5521
    7777 ;2451 ;3742
    7777 ;2454 ;2432
    7777 ;2457 ;1122
    7777 ;2462 ;0062
    7777 ;2464 ;7272
    7777 ;2466 ;4627
    7777 ;2470 ;2437
    7777 ;2472 ;0515
    7777 ;2473 ;6323
    7777 ;2475 ;4402
    7777 ;2476 ;5263
    7777 ;2477 ;6415
    7777 ;2500 ;7546
    7777 ;2502 ;0700
    7777 ;2503 ;2033
    7777 ;2503 ;6506
    7777 ;2504 ;3433
    7777 ;2505 ;0110
    7777 ;2505 ;5034
    7777 ;2506 ;1762
    7777 ;2506 ;2751
    7777 ;2506 ;3740
    7777 ;2506 ;5177
    7777 ;2506 ;6436
    7777 ;2506 ;7426
    7777 ;2506 ;4727
    7777 ;2506 ;1762
    7777 ;2505 ;7014
    7777 ;2505 ;4316
    7777 ;2505 ;1350
    7777 ;2504 ;2714
    7777 ;2503 ;4257
    7777 ;2502 ;5625
    7777 ;2501 ;7171
    7777 ;2501 ;0536
    7777 ;2500 ;0374
```
—Continued
```
    7777 ;2477 ;0502
    7777 ;2476 ;0337
    7777 ;2475 ;0446
    7777 ;2474 ;0552
    7777 ;2473 ;2366
    7777 ;2472 ;4202
    7777 ;2471 ;6266
    7777 ;2471 ;0104
    7777 ;2470 ;2167
    7777 ;2467 ;4772
    7777 ;2466 ;7577
    7777 ;2466 ;2132
    7777 ;2465 ;4736
    7777 ;2464 ;7542
    7777 ;2425 ;5527
    7777 ;2356 ;6550
    7777 ;2317 ;1567
    7777 ;2260 ;3243
    7777 ;2222 ;3622
    7777 ;2165 ;3353
    7777 ;2131 ;3246
    7777 ;2104 ;7640
    7777 ;2061 ;0436
    7777 ;2035 ;6162
    7777 ;2013 ;1102
    7776 ;3762 ;1717
    7776 ;3733 ;5013
    7776 ;3705 ;6023
    7776 ;3660 ;5473
    7776 ;3634 ;4312
    7776 ;3611 ;1565
    7776 ;3572 ;7543
/
/DIS-IV
START8,0;0;0  /THREE DUMMY LOCATIONS.
    7777 ;2773 ;7706
    7777 ;3001 ;6326
    7777 ;3007 ;5215
    7777 ;3015 ;4106
    7777 ;3023 ;3244
    7777 ;3030 ;1252
    7777 ;3034 ;7527
    7777 ;3041 ;5536
    7777 ;3046 ;4012
    7777 ;3053 ;2537
    7777 ;3057 ;7556
    7777 ;3064 ;5042
    7777 ;3071 ;2332
    7777 ;3075 ;7617
    7777 ;3102 ;5356
    7777 ;3106 ;6706
    7777 ;3113 ;0506
    7777 ;3117 ;2037
    7777 ;3123 ;3640
    7777 ;3127 ;5711
    7777 ;3133 ;4022
    7777 ;3137 ;2406
    7777 ;3143 ;0771
    7777 ;3146 ;7623
    7777 ;3152 ;6207
    7777 ;3155 ;6135
    7777 ;3160 ;5615
    7777 ;3163 ;5543
    7777 ;3166 ;5473
    7777 ;3171 ;5423
    7777 ;3173 ;2762
    7777 ;3175 ;0050
    7777 ;3176 ;5410
    7777 ;3200 ;2745
    7777 ;3202 ;0305
    7777 ;3203 ;0717
```

―Continued

```
7777 ;3204 ;1060
7777 ;3205 ;1473
7777 ;3206 ;2105
7777 ;3207 ;2517
7777 ;3210 ;2412
7777 ;3211 ;2033
7777 ;3212 ;1727
7777 ;3213 ;1622
7777 ;3214 ;1515
7777 ;3214 ;7160
7777 ;3215 ;4625
7777 ;3216 ;2540
7777 ;3217 ;0205
7777 ;3217 ;5650
7777 ;3220 ;2057
7777 ;3220 ;6263
7777 ;3221 ;2467
7777 ;3221 ;6673
7777 ;3222 ;3100
7777 ;3222 ;6570
7777 ;3223 ;2253
7777 ;3223 ;5742
7777 ;3224 ;1160
7777 ;3224 ;4645
7777 ;3224 ;6355
7777 ;3224 ;7615
7777 ;3225 ;1052
7777 ;3225 ;2560
7777 ;3225 ;4020
7777 ;3225 ;5257
7777 ;3225 ;6765
7777 ;3226 ;0225
7777 ;3226 ;1465
7777 ;3226 ;3173
7777 ;3226 ;3712
7777 ;3226 ;4702
7777 ;3226 ;5150
7777 ;3226 ;5672
7777 ;3226 ;6410
7777 ;3226 ;7402
7777 ;3227 ;0120
7777 ;3227 ;0637
7777 ;3227 ;1357
7777 ;3227 ;2077
7777 ;3074 ;7206
7777 ;2642 ;2461
7777 ;2450 ;7265
7777 ;2315 ;3512
7777 ;2206 ;4063
7777 ;2131 ;3516
7777 ;2057 ;1121
7777 ;2007 ;6455
7776 ;3707 ;6330
7776 ;3607 ;3757
7776 ;3551 ;5325
7776 ;3516 ;1157
7776 ;3465 ;0012
7776 ;3436 ;3627
7776 ;3412 ;4427
7776 ;3376 ;4667
7776 ;3363 ;5025
7776 ;3351 ;5575
7776 ;3340 ;6757
7776 ;3331 ;0552
7776 ;3325 ;2435
7776 ;3322 ;1517
7776 ;3317 ;4535
7776 ;3315 ;4227
7776 ;3314 ;1117
7776 ;3313 ;3725
7776 ;3313 ;1227
```

―Continued

```
7776 ;3313 ;1227
7776 ;3313 ;3725
7776 ;3314 ;1117
7776 ;3315 ;2770
7776 ;3317 ;0060
7776 ;3320 ;7125
7776 ;3323 ;0152
7776 ;3325 ;3675
7776 ;3326 ;1070
7776 ;3326 ;7525
7776 ;3327 ;6700
7776 ;3330 ;6570
7776 ;3332 ;0442
7776 ;3336 ;6452
7776 ;3344 ;1653
7776 ;3352 ;1532
7776 ;3360 ;6065
7776 ;3367 ;7075
7776 ;3374 ;5103
7776 ;3401 ;5610
7776 ;3407 ;1012
7776 ;3414 ;7427
7776 ;3423 ;0027
7776 ;3434 ;6020
7776 ;3446 ;6510
7776 ;3461 ;3135
7776 ;3474 ;3002
7776 ;3507 ;6602
7776 ;3523 ;5620
7776 ;3540 ;1312
7776 ;3555 ;2200
END2,0
/E TABLES
/22 AUG 71
```

What is claimed is:

1. A digital, abridged spectrophotometer comprising:
a detecting head with a housing defining a roughly spherical, reflective internal surface, a light source mounted for illuminating said internal surface, a viewing port for receiving a sample image to be analyzed, a plurality of photo-responsive devices each mounted for receiving light over the whole of said sort, a plurality of light filters each removing incident light except from a different band and each mounted so that output light is incident on one of said photoresponsive devices, and
digital computer means for determining the electrical conditions of said photo-responsive devices and calculating color values.

2. A spectrophotometer as in claim 1 wherein said detecting head further includes a movable member means, means mounting said movable member means for movement between an off port position and a port covering position, said member including a sheet of standard color material mounted on said member means for covering said viewing port when said member means is immediately over said viewing port in said port covering position.

3. A spectrophotometer as in claim 2 wherein said detecting head further includes means for urging said member means toward said off port position.

4. A spectrophotometer as in claim 2 wherein said detecting head further includes switch means mounted adjacent said movable member means for operating said computer means while said member means is in said port covering position.

5. A spectrophotometer as in claim 4 wherein said movable member means includes a plunger having a handle portion for engaging said switch means, a further portion being axially movable with respect to said handle portion, a first spring urging said further portion away from said viewing port, and a second spring urging said handle portion away from said viewing port.

6. A spectrophotometer as in claim 2 wherein said detecting head includes a pivotably mounted member mounted on said housing for movement to a position over said viewing port and then down covering said viewing port, a standard second color sheet mounted on said pivotably mounted member, and spring means urging said pivotably mounted member away from said viewing port and wherein said first sheet is vitrolite and said second sheet black.

7. A spectrophotometer as in claim 2 wherein said viewing port includes a clear glass pane.

8. A spectrophotometer as in claim 2 wherein said detecting head includes means for mounting said photo-responsive devices in said housing concentrically about an axis which substantially perpendicularly intersects the center of said viewing port.

9. A spectrophotometer as in claim 8 wherein said detecting means includes heating means mounted in said photo-responsive devices mounting means.

10. A spectrophotometer as in claim 2 wherein said housing has a light port for receiving light from said source and wherein said detecting means includes means for mounting said light source adjacent said light port.

11. A spectrophotometer as in claim 10 wherein said light source mounting means includes a plurality of fins for cooling.

12. A spectrophotometer as in claim 10 further including means for circulating air through said light source mounting means and past said housing for cooling.

13. A spectrophotometer as in claim 2 wherein said housing is provided with cooling fins.

14. A spectrophotometer as in claim 2 wherein said housing includes means for mounting said housing on a table.

15. A spectrophotometer as in claim 2 further including means for displaying color values.

16. A spectrophotometer as in claim 2 wherein said photo-responsive devices are photodiodes.

17. A spectrophotometer as in claim 16 wherein said photo-diodes span the color band between 4000 and 7000 Angstroms with separators of 200 Angstroms.

18. A spectrophotometer as in claim 2 wherein said standard sheet is vitrolite.

19. A spectrophotometer as in claim 2 wherein said movable member means includes a standard second color sheet and means for selecting one or the other of the first mentioned and second standard color sheets to cover said viewing port when said movable member means is in said port covering position.

20. A spectrophotometer as in claim 19 wherein one of said standard sheets is black and the other is of a substantially different color.

21. A spectrophotometer as in claim 19 wherein one of said standard color sheets is black and the other is vitrolite.

22. A digital abidged spectrophotometer as in claim 1 wherein said computer means includes means for calibrating from signals derived by said photo-responsive devices viewing a standard sample prior to each sample reading, means for providing a given time after calibration for sample reading and means for calculating reflectance and color quantifier values from the signals received from said photo-responsive devices during a sample reading.

23. A digital, abridged spectrophotometer comprising:
a detecting head having a housing providing a viewing port for receiving a sample to be color analyzed,
means, including substantially more than five photo-responsive devices each having light receiving means mounted inside said housing to receive incident light from said port with said devices being responsive to a different color band, for simultaneously providing exteriorly of said housing a corresponding number of output signals varying as a function of the respectively received incident light,
standardizing means including at least one standard color sample,
means for moving said standardizing means between a sample off port position and a sample port covering position, and
digital computer means for interrogating each of said photo-responsive devices and determining the color values of material over said viewing port including recalibration means responsive to each of said output signals for calculating the present reflectance equations respectively for said different color bands after said standardizing means has been moved to said port covering position and means operative automatically then on the basis of said present reflectance equations for determining in response to the instant output signals then received from said-photo-responsive devices the reflectance and color quantifier values of an unknown color sample of material covering said port.

24. A spectrophotometer as in claim 23 wherein said moving means includes a movable member means, and means mounting said movable member means for movement between said sample off port and sample port covering positions.

25. A spectrophotometer as in claim 24 wherein said detecting head further includes means for urging said member toward said off port position.

26. A spectrophotometer as in claim 24 wherein said detecting head further includes switch means mounted adjacent said movable member means for operating said computer means while said member means is in said port covering position.

27. A spectrophotometer as in claim 26 wherein said movable member means includes a plunger having a handle portion for engaging said switch means, a further portion being axially movable with respect to said handle portion, a first spring urging said further portion away from said viewing port, and a second spring urging said handle portion away from said viewing port.

28. A spectrophotometer as in claim 24 wherein said detecting head further includes a pivotably mounted member mounted on said housing for mvoement to a position over said viewing port and then down covering said viewing port, a standard second color sheet mounted on said pivotably mounted member, and spring means urging said pivotably mounted member away from said viewing port, and wherein said first sheet is vitrolite said second sheet black.

29. A spectrophotometer as in claim 24 wherein said viewing port includes a clear glass pane.

30. A spectrophotometer as in claim 24 wherein said detecting head includes means for mounting said photo-responsive devices in said housing concentrically about an axis which substantially perpendicularly intersects the center of said viewing port.

31. A spectrophotometer as in claim 30 wherein said detecting means includes heating means mounted in said photo-responsive devices mounting means.

32. A spectrophotometer as in claim 31 wherein said light source mounting means includes a plurality of fins for cooling.

33. A spectrophotometer as in claim 31 further including means for circulating air through said light source mounting means and past said housing for cooling.

34. A spectrophotometer as in claim 24 wherein said housing has a light port for receiving light from said source and wherein said detectig means includes means for mounting said light source adjacent said light port.

35. A spectrophotometer as in claim 24 wherein said housing is provided with cooling fins.

36. A spectrophotometer as in claim 24 wherein said housing includes means for mounting said housing on a table.

37. A spectrophotometer as in claim 24 further including means for displaying color values.

38. A spectrophotometer as in claim 24 wherein said photo-responsive devices are photo-diodes.

39. A spectrophotometer as in claim 38 wherein said photo-diodes span the color band between 4000 and 7000 Angstroms with separators of 200 Angstroms.

40. A spectrophotometer as in claim 24 wherein said standard sheet is vitrolite.

41. A spectrophotometer as in claim 23 wherein said one standard color sample is of one color and said standardizing means includes a second different colored standard color sample which is black,
said moving means being operative to move one of said standard samples and then the other to said port covering position,
said recalibration means being responsive to the plurality of outputs signals resulting from both of said standard samples being successively in said port covering position for calculating the said present reflectance equations for each said different color band based on the present amount of incident light received by said photoresponsive devices while both of said standard samples are successively covering said port,
said moving means being operative to move said standardizing means to said port covering position with said unknown color sample being between said port and one of said standard samples for the determination by said determinng means of the reflectance and color quantifier values of said unknown color sample.

42. A spectrophotometer as in claim 41 wherein said white one standard color sample is vitrolite and said recalibration means includes means for pre-storing reflectance values for each of said different color bands for each of said standard color samples and means for relating the photo-responsive device output signals resulting from the sampled vitrolite and black samples to the stored reflectance values respectively to effect the said present reflectance equations.

43. A digital abridged spectrophotometer for determining color values of material of unknown color comprising:
detecting means including a detecting head having a viewing port for receiving said material to be color analyzed,
said detecting means including source means for providing light over the visible spectrum inside said head and substantially more than five photo-responsive devices each having light receiving means mounted inside said head for receiving incident reflected light from said port with said devices being responsive over all said spectrum respectively to a different color band for simultaneously providing exteriorly of said head a corresponding number of signals varying as a function of the respectively received incident light,
standardizing means including two differently colored standard samples,
means for alternately moving each of said samples between a sample off port position and a sample port covering position during calibrating times and for moving one of said samples to said port covering position with said material therebetween during color analyzing times,
control means for interrogating each of said photoresponsive devices including digital computer means for calibrating from signals derived by said photoresponsive devices effectively viewing said standard samples alternately once for each color analyzing time,
means for alternately establishing said calibrating and analyzing times, and
means in said digital computer for calculating the color values from the signals received from said photoresponsive devices during said color analyzing times.

44. A spectrophotometer as in claim 43 wherein said detecting head further includes a housing, movable member means, means mounting said movable member means on said housing for movement between said sample off port and sample port covering positions.

45. A spectrophotometer as in claim 44 wherein said detecting head further includes means for urging said member toward said off port position.

46. A spectrophotometer as in claim 44 wherein said detecting head includes a pivotably mounted member mounted on said housing for movement to a position over said viewing port and then down covering said viewing port, and spring means urging said pivotably mounted member away from said viewing port, and wherein one sample is vitrolite and the other sample black.

47. A spectrophotometer as in claim 44 wherein said viewing port includes a clear glass pane.

48. A spectrophotometer as in claim 44 wherein said housing has a light port for receiving light from said source and wherein said detecting means includes means for mounting said light source adjacent said light port.

49. A spectrophotometer as in claim 44 further including means for displaying color values.

50. A spectrophotometer as in claim 44 wherein one of said standard samples is vitrolite and the other is black.

51. A digital abridged spectrophotometer comprising:
a detecting head including a plurality of photoresponsive devices each mounted for receiving incident light over a different color band and providing an output signal varying as a function of received light, control means for interrogating each of said photoresponsive devices including means for calibrating from signals derived by said photo-responsive devices viewing a standard sample prior to each sample reading, means for providing a given time after calibration for sample reading, and means for calculating the color values from the signals received from said photo-responsive devices during a sample reading, wherein said detecting head further includes a housing, movable member means, means mounting said movable member means on said housing for movement from a rest position to a position immediately over said viewing port, a sheet of standard color material mounted on said movable member means for covering said viewing port when said member means is immediately, over said viewing port, and switch means mounted adjacent said member for operating said control means when said standard sheet is covering said viewing port.

52. A spectrophotometer as in claim 51 wherein said member includes a plunger having a handle portion for engagig said switch means, a further portion being axially movable with respect to said handle portion, a first spring urging said further portion away from said viewing port, and a second spring urging said handle portion away from said viewing port.

53. A digital abridged spectrophotometer comprising:

a detecting head including a plurality of photoresponsive devices each mounted for receiving incident light over a different color band and providing an output signal varying as a function of received light, control means for interrogating each of said photoresponsive devices including means for calibrating from signals derived by said photo-responsive devices viewing a standard sample prior to each sample reading, means for providing a given time after calibration for sample reading, and means for calculating the color values from the signals received from said photo-responsive devices during a sample reading, wherein said detecting head further includes a housing, movable member means, means mounting said movable member means on said housing for movement from a rest position to a position immediately over said viewing port, a sheet of standard color material mounted on said movable member means for covering said viewing port when said member means is immediately over said viewing port, and means for mounting said photo-responsive devices in said housing concentrically about an axis which substantially perpendicularly intersects the center of said viewing port.

54. A spectrophotometer as in claim 53 wherein said detecting means includes heating means mounted in said photo-responsive devices mounting means.

55. A digital abridged spectrophotometer comprising:

a detecting head including a plurality of photoresponsive devices each mounted for receiving incident light over a different color band and providing an output signal varying as a function of received light, control means for interrogating each of said photoresponsive devices including means for calibrating from signals derived by said photo-responsive devices viewing a standard sample prior to each sample reading, means for providing a given time after calibration for sample reading, and means for calculating the color values from the signals received from said photo-responsive devices during a sample reading wherein said detecting head further includes a housing, movable member means on said housing for movement from a rest position to a position immediately over said viewing port, and a sheet of standard color material mounted on said movable member means for covering said viewing port when said member means is immediately over said viewing port, wherein said housing has a light port for receiving light from said source, said detecting head includes means for mounting said light source adjacent said light port, and said light source mounting means includes a plurality of fins for cooling.

56. A digital abridged spectrophotometer comprising:

a detecting head including a plurality of photoresponsive devices each mounted for receiving incident ligh over a different color band and providing an output signal varying as a function of received light, control means for interrogating each of said photoresponsive devices includng means for calibrating from signals derived by said photo-responsive devices viewing a standard sample prior to each sample reading.

means for providing a given time after calibration for sample reading, and means for calculating the color values from the signals received from said photo-responsive devices during a sample reading, wherein said detecting head further includes a housing, movable member means, means mounting said movable member means on said housing for movement from a rest position to a position immediately over said viewing port, and a sheet of standard color material mounted on said movable member means for covering said viewing point when said member means is immediately over said viewing port, wherein said housing has a light port for receiving light from said source and wherein said detecting means includes means for mounting said light source adjacent said light port, and further including means for circulating air through said light source mounting means and past said housing for cooling.

57. A digital abridged spectrophotometer comprising:

a detecting head including a plurality of photoresponsive devices each mounted for receiving incident light over a different color band and providing an output signal varying as a function of received light, control means for interrogating each of said photoresponsive devices including means for calibrating from signals derived by said photo-responsive devices viewing a standard sample prior to each sample reading,
means for providing a given time after calibration for sample reading,
and means for calculating the color values from the signals received from said photo-responsive devices during a sample reading,
wherein said detecting head further includes a housing, movable member means, means mounting said movable member means on said housing for movement from a rest position to a position immediately over said viewing port, and a sheet of standard color material mounted on said movable member means for covering said viewing port when said member means is immediately over said viewing port, and said housing is provided with cooling fins.

58. A digital abridged spectrophotometer comprising:
a detecting head including a plurality of photoresponsive devices each mounted for receiving incident light over a different color band and providing an output siganl varying as a function of received light,
control means for interrogating each of said photoresponsive devices including means for calibrating from signals derived by said photo-responsive devices viewing a standard sample prior to each sample reading,
means for providing a given time after calibration for sample reading, and
means for calculating the color values from the signals received from said photo-responsive devices during a sample reading,
wherein said detecting head further includes a housing, movable member means, means mounting said movable member means on said housing for movement from a rest position to a position immediately over said viewing port, and a sheet of standard color material mounted on said movable member means for covering said viewing port when said member means is immediately over said viewing port, and said housing includes means for mounting said housing on a table.

59. A digital abridged spectrophotometer comprising:
a detecting head including a plurality of photoresponsive devices each mounted for receiving incident light over a different color band and providing an output signal varying as a function of received light,
control means for interrogating each of said photoresponsive devices including means for calibrating from signals derived by said photo-responsive devices viewing a standard sample prior to each sample reading,
means for providing a given time after calibration for sample reading, and
means for calculating the color values from the signals received from said photo-responsive devices during a sample reading,
wherein said detecting head further includes a housing, movable member means, means mounting said movable member means on said housing for movement from a rest position to a position immediately over said viewing port, and a sheet of standard color material mounted on said movable member means for covering said viewing port when said member means is immediately over said viewing port, and
wherein said photo-responsive devices are photo-diodes.

60. A spectrophotometer as in claim 59 wherein said photo-diodes span the color band between 4000 to 7000 Angstroms with separations of 200 Angstroms.

61. A method of measuring the color of a sample comprising the steps of:
calibrating by color analyzing a standard sheet of material,
establishing a predetermined time window following said calibration,
calculating the color values for a sample only if the sample is analyzed within said time window.

62. A method as in claim 61 wherein said step of calibrating includes analyzing first and second sheets of material.

63. A method as in claim 61 further including displaying color values derived from the reflectance values.

64. A digital, abridged spectrophotometer comprising:
a detecting head having a housing providing a viewing port,
a plurality of photo-responsive devices each mounted in said housing for receiving incident light and being responsive to a different color band for providing an output signal varying as a function of the received light,
a sheet of standard color material,
means mounted on said housing for moving said standard sheet from a rest position to a position immediately over said port,
said moving means including a manually operated plunger member and means mounting said plunger member for movement from a rest position to a position immediately over said viewing port, and
digital computer means for interrogating each of said photo-responsive devices and determining the color values of material over said port.

* * * * *